US011887386B1

(12) United States Patent
Davis et al.

(10) Patent No.: US 11,887,386 B1
(45) Date of Patent: Jan. 30, 2024

(54) UTILIZING AN INTELLIGENT IN-CABIN MEDIA CAPTURE DEVICE IN CONJUNCTION WITH A TRANSPORTATION MATCHING SYSTEM

(71) Applicant: Lyft, Inc., San Francisco, CA (US)

(72) Inventors: Matthew Allen Davis, San Francisco, CA (US); Ethan Duncan Eyler, San Francisco, CA (US); Yahui Jin, San Francisco, CA (US); Rachel Hallie Lomax, San Francisco, CA (US); Avneet Oberoi, Mountain View, CA (US); Douglas Sigelbaum, San Francisco, CA (US); Michael Anthony Vernier, Cupertino, CA (US); Shu-min Wee, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 162 days.

(21) Appl. No.: 16/834,820

(22) Filed: Mar. 30, 2020

(51) Int. Cl.
*G06V 20/59* (2022.01)
*G07C 5/00* (2006.01)
(Continued)

(52) U.S. Cl.
CPC .......... *G06V 20/597* (2022.01); *B60W 40/08* (2013.01); *G07C 5/008* (2013.01); *G07C 5/0816* (2013.01); *H04W 4/40* (2018.02)

(58) Field of Classification Search
CPC ...... G06V 20/597; H04W 4/40; B60W 40/04; G07C 5/008; G07C 5/0816
See application file for complete search history.

(56) References Cited

U.S. PATENT DOCUMENTS

D119,041 S   2/1940  MacDonald et al.
D205,209 S   7/1966  Priddis
(Continued)

FOREIGN PATENT DOCUMENTS

CA        174696       8/2019
CN    104992509 A     10/2015
(Continued)

OTHER PUBLICATIONS

Examiner's Report as received in Canadian application 3,035,259 dated May 5, 2021.
(Continued)

*Primary Examiner* — Muhammad Adnan
(74) *Attorney, Agent, or Firm* — Keller Preece PLLC

(57) ABSTRACT

The present disclosure relates to systems, non-transitory computer-readable media, and methods for intelligently identifying upload trigger events and/or storage trigger events to selectively store a media recording portion at an in-cabin media capture device and/or transmit the media recording portion to a remote server. For example, utilizing a trigger analysis model, the disclosed systems can analyze transportation service data such as motion data, global position system (GPS) data, audio data, digital incident reports from provider/requestor devices, etc. to identify certain trigger events. These trigger events may include, for instance, a collision event, a transportation irregularity, a confrontation event, provider/requestor media recording requests, among others. In response to identifying a trigger event, the disclosed systems can cause a specific portion of a media recording to be stored in a reserved storage partition of the in-cabin media capture device and can selectively upload the media recording portion to a remote server.

20 Claims, 12 Drawing Sheets

(51) Int. Cl.
     *H04W 4/40*     (2018.01)
     *B60W 40/08*    (2012.01)
     *G07C 5/08*     (2006.01)

(56)            References Cited

U.S. PATENT DOCUMENTS

| | | |
|---|---|---|
| D306,042 S | 2/1990 | Evenson |
| D307,447 S | 4/1990 | Evenson |
| D319,848 S | 9/1991 | Hofman |
| D320,235 S | 9/1991 | Hofman |
| D327,506 S | 6/1992 | Bartholomai et al. |
| D374,191 S | 10/1996 | Terrebonne et al. |
| 5,918,397 A | 7/1999 | Elmer |
| D418,493 S | 1/2000 | Jobs et al. |
| 6,028,537 A | 2/2000 | Suman et al. |
| 6,271,805 B1 | 8/2001 | Yonezawa |
| D493,454 S | 7/2004 | Andre et al. |
| 6,759,965 B1 | 7/2004 | Hatjasalo et al. |
| D508,538 S | 8/2005 | Furr |
| D521,471 S | 5/2006 | Hoehn et al. |
| D527,359 S | 8/2006 | Rashid |
| D567,876 S | 4/2008 | Au et al. |
| 7,360,248 B1 | 4/2008 | Kanevsky et al. |
| D582,394 S | 12/2008 | Hong et al. |
| D624,557 S | 9/2010 | Allen et al. |
| D642,159 S | 7/2011 | Joseph |
| D659,677 S | 5/2012 | Kim et al. |
| 8,823,508 B2 | 9/2014 | Thiruvengada et al. |
| D732,049 S | 6/2015 | Amin |
| 9,066,206 B2 | 6/2015 | Lin et al. |
| 9,070,101 B2 | 6/2015 | Abhyanker |
| D734,349 S | 7/2015 | Amin et al. |
| D738,901 S | 9/2015 | Amin |
| 9,151,614 B2 | 10/2015 | Poppen et al. |
| D743,978 S | 11/2015 | Amin |
| 9,230,292 B2 | 1/2016 | Amin et al. |
| D749,116 S | 2/2016 | Luo |
| D749,543 S | 2/2016 | Lovegrove |
| D750,110 S | 2/2016 | Amin et al. |
| D754,675 S | 4/2016 | Vazquez et al. |
| 9,327,641 B1 | 5/2016 | Bowe et al. |
| D759,032 S | 6/2016 | Amin et al. |
| 9,392,418 B2 | 7/2016 | Lubeck |
| D763,894 S | 8/2016 | Lamparelli |
| D766,302 S | 9/2016 | Phelan et al. |
| 9,442,888 B2 | 9/2016 | Stanfield et al. |
| 9,459,622 B2 | 10/2016 | Abhyanker |
| D772,454 S | 11/2016 | Ma |
| 9,494,938 B1 | 11/2016 | Kemler et al. |
| D773,941 S | 12/2016 | Holzer |
| 9,536,271 B2 | 1/2017 | Kalanick et al. |
| 9,552,564 B1 | 1/2017 | Martenis |
| 9,628,975 B1 * | 4/2017 | Watkins .............. H04W 4/027 |
| 9,635,319 B1 * | 4/2017 | Englander ............ G06V 20/597 |
| 9,650,007 B1 * | 5/2017 | Snyder .................. H04W 4/029 |
| 9,754,338 B2 | 9/2017 | Haparnas et al. |
| 9,769,616 B1 | 9/2017 | Pao et al. |
| 9,787,951 B2 * | 10/2017 | Kannon .................. B60Q 5/006 |
| D803,812 S | 11/2017 | Liu et al. |
| 9,827,897 B1 | 11/2017 | Muir |
| D806,293 S | 12/2017 | Pennington |
| D812,609 S | 3/2018 | Kimbrough et al. |
| D819,068 S | 5/2018 | Scheel et al. |
| 9,965,960 B1 | 5/2018 | McDavitt-Van Fleet |
| 10,147,154 B2 | 12/2018 | Haparnas et al. |
| 10,300,876 B1 * | 5/2019 | Jacob ................. B60R 21/0136 |
| 10,310,505 B1 | 6/2019 | Hanson et al. |
| D854,568 S | 7/2019 | Hu |
| 10,365,783 B2 | 7/2019 | Bowden et al. |
| 10,400,975 B1 | 9/2019 | Bushre |
| D868,895 S | 12/2019 | McMillin et al. |
| D875,115 S | 2/2020 | Yan |
| D875,133 S | 2/2020 | Wang et al. |
| 10,554,783 B2 | 2/2020 | Matthiesen et al. |
| D879,804 S | 3/2020 | Corona et al. |
| D880,498 S | 4/2020 | Shahidi et al. |
| D880,499 S | 4/2020 | Fatnani et al. |
| 10,636,108 B2 | 4/2020 | Eyler et al. |
| 10,688,919 B2 | 6/2020 | Kalanick et al. |
| D896,237 S | 9/2020 | Bentley et al. |
| 10,759,442 B2 * | 9/2020 | Stenneth ................ G07C 5/008 |
| 10,791,536 B1 | 9/2020 | Murphy |
| D904,425 S | 12/2020 | Paul |
| D907,660 S | 1/2021 | Lee et al. |
| D912,686 S | 3/2021 | Yang |
| D915,440 S | 4/2021 | Kim et al. |
| D915,449 S | 4/2021 | Menninger |
| D916,720 S | 4/2021 | Park et al. |
| D916,764 S | 4/2021 | Kirsanov et al. |
| D917,544 S | 4/2021 | Wong |
| D931,902 S | 9/2021 | Moore et al. |
| 11,118,930 B2 * | 9/2021 | Eyler ................. G01C 21/3638 |
| D935,443 S | 11/2021 | Yuan |
| 11,443,398 B2 | 9/2022 | Haparnas et al. |
| D967,266 S | 10/2022 | McMillin et al. |
| 2002/0065046 A1 | 5/2002 | Mankins et al. |
| 2003/0217150 A1 | 11/2003 | Roese et al. |
| 2004/0243430 A1 | 12/2004 | Horstemeyer |
| 2005/0030224 A1 * | 2/2005 | Koch ................... G08B 25/016 342/357.31 |
| 2005/0100329 A1 * | 5/2005 | Lao ........................ H04N 23/66 348/207.99 |
| 2005/0109075 A1 * | 5/2005 | Kithil ........................ G01L 1/16 73/12.09 |
| 2006/0290158 A1 | 12/2006 | Cullison |
| 2007/0133210 A1 | 6/2007 | Watson et al. |
| 2007/0179709 A1 | 8/2007 | Doyle |
| 2008/0084360 A1 | 4/2008 | Shingai |
| 2008/0114629 A1 | 5/2008 | Pavlov |
| 2008/0195829 A1 | 8/2008 | O'Sullivan |
| 2008/0284578 A1 | 11/2008 | Mouratidis |
| 2009/0044235 A1 * | 2/2009 | Davidson ......... H04N 21/25875 725/86 |
| 2009/0099732 A1 * | 4/2009 | Pisz ...................... G08G 1/205 701/45 |
| 2009/0160229 A1 * | 6/2009 | Mabuchi ............... B60N 2/0292 297/217.3 |
| 2009/0248283 A1 * | 10/2009 | Bicego, Jr. ........ G08G 1/096827 701/117 |
| 2009/0319181 A1 | 12/2009 | Khosravy et al. |
| 2010/0112945 A1 * | 5/2010 | Hanif ............... H04N 21/42202 700/12 |
| 2010/0283609 A1 * | 11/2010 | Remer ................. G08B 25/016 340/541 |
| 2011/0156894 A1 | 6/2011 | Lin et al. |
| 2011/0195758 A1 * | 8/2011 | Damale ............. H04M 1/72451 455/569.1 |
| 2011/0301985 A1 | 12/2011 | Camp et al. |
| 2012/0081389 A1 | 4/2012 | Dilts |
| 2012/0137256 A1 | 5/2012 | Lalancette et al. |
| 2012/0290652 A1 | 11/2012 | Boskovic |
| 2013/0018795 A1 | 1/2013 | Kolhatkar et al. |
| 2013/0096827 A1 | 4/2013 | McCall et al. |
| 2013/0132140 A1 | 5/2013 | Amin et al. |
| 2013/0332026 A1 * | 12/2013 | McKown .............. B60R 21/013 701/33.7 |
| 2014/0011522 A1 | 1/2014 | Lin et al. |
| 2014/0129951 A1 | 5/2014 | Amin et al. |
| 2014/0172727 A1 | 6/2014 | Abhyanker et al. |
| 2014/0266594 A1 | 9/2014 | Reiser |
| 2015/0148989 A1 | 5/2015 | Cooper et al. |
| 2015/0161564 A1 | 6/2015 | Sweeney et al. |
| 2015/0161752 A1 | 6/2015 | Barreto et al. |
| 2015/0166009 A1 | 6/2015 | Outwater et al. |
| 2015/0199664 A1 | 7/2015 | Buckman et al. |
| 2015/0210287 A1 | 7/2015 | Penilla et al. |
| 2015/0262430 A1 | 9/2015 | Farrelly et al. |
| 2015/0271290 A1 | 9/2015 | Tao et al. |
| 2015/0289109 A1 | 10/2015 | Lubeck et al. |
| 2015/0317801 A1 * | 11/2015 | Bentley ................ G08B 21/043 382/107 |
| 2015/0332425 A1 | 11/2015 | Kalanick et al. |
| 2015/0339923 A1 | 11/2015 | Konig |

(56) References Cited

U.S. PATENT DOCUMENTS

| | | | |
|---|---|---|---|
| 2015/0348408 A1 | 12/2015 | Demisse | |
| 2015/0352947 A1 | 12/2015 | Hubschman et al. | |
| 2015/0356470 A1 | 12/2015 | Mitchell | |
| 2016/0016526 A1 | 1/2016 | Louboutin | |
| 2016/0027307 A1 | 1/2016 | Abhyanker et al. | |
| 2016/0034828 A1 | 2/2016 | Sarawgi et al. | |
| 2016/0034845 A1 | 2/2016 | Hiyama et al. | |
| 2016/0086391 A1 | 3/2016 | Ricci | |
| 2016/0093212 A1* | 3/2016 | Barfield, Jr. | G08G 1/04 348/144 |
| 2016/0094964 A1* | 3/2016 | Barfield, Jr. | H04W 4/90 340/870.07 |
| 2016/0117610 A1 | 4/2016 | Ikeda | |
| 2016/0119260 A1 | 4/2016 | Ghafourifar et al. | |
| 2016/0140649 A1 | 5/2016 | Kleve et al. | |
| 2016/0292596 A1 | 10/2016 | Gaitan et al. | |
| 2016/0293012 A1 | 10/2016 | Lubeck | |
| 2016/0321566 A1 | 11/2016 | Liu et al. | |
| 2016/0321771 A1 | 11/2016 | Liu et al. | |
| 2016/0334232 A1 | 11/2016 | Zhuang | |
| 2016/0349067 A1 | 12/2016 | Fowe | |
| 2016/0364678 A1 | 12/2016 | Cao | |
| 2017/0038948 A1 | 2/2017 | Cun et al. | |
| 2017/0052034 A1 | 2/2017 | Magazinik | |
| 2017/0053574 A1 | 2/2017 | Byrd | |
| 2017/0090850 A1 | 3/2017 | Amrhein et al. | |
| 2017/0115125 A1 | 4/2017 | Outwater et al. | |
| 2017/0124835 A1* | 5/2017 | Boyina | H04M 1/72421 |
| 2017/0147959 A1 | 5/2017 | Sweeney et al. | |
| 2017/0178269 A1 | 6/2017 | McKinnon et al. | |
| 2017/0193404 A1 | 7/2017 | Yoo et al. | |
| 2017/0193826 A1 | 7/2017 | Marueli et al. | |
| 2017/0270794 A1 | 9/2017 | Sweeney | |
| 2017/0305332 A1 | 10/2017 | Albou et al. | |
| 2017/0350719 A1 | 12/2017 | Moore et al. | |
| 2018/0047091 A1 | 2/2018 | Ogden et al. | |
| 2018/0053215 A1 | 2/2018 | Costa | |
| 2018/0060827 A1* | 3/2018 | Abbas | G06Q 10/1095 |
| 2018/0089605 A1 | 3/2018 | Poornachandran et al. | |
| 2018/0189713 A1 | 7/2018 | Matthiesen et al. | |
| 2018/0191863 A1 | 7/2018 | Matthiesen et al. | |
| 2018/0203591 A1 | 7/2018 | Callen et al. | |
| 2018/0262891 A1 | 9/2018 | Wu et al. | |
| 2019/0050787 A1* | 2/2019 | Munafo | G06N 20/00 |
| 2019/0073738 A1 | 3/2019 | Haparnas et al. | |
| 2019/0283763 A1* | 9/2019 | Wang | G07C 5/08 |
| 2020/0104601 A1* | 4/2020 | Karoui | H04N 23/66 |
| 2020/0105130 A1* | 4/2020 | Chen | H04W 4/02 |
| 2020/0107226 A1 | 4/2020 | Raleigh et al. | |
| 2020/0126325 A1* | 4/2020 | Jeon | G07C 5/0866 |
| 2020/0151675 A1 | 5/2020 | McCormack | |
| 2020/0228628 A1 | 7/2020 | Matthiesen et al. | |
| 2021/0097315 A1* | 4/2021 | Carruthers | G08B 13/19645 |
| 2021/0118078 A1* | 4/2021 | Wang | G06Q 50/265 |
| 2021/0192241 A1* | 6/2021 | Zhu | B60R 25/305 |
| 2021/0402942 A1* | 12/2021 | Torabi | B60W 50/14 |
| 2022/0237277 A1 | 7/2022 | Rahman et al. | |
| 2022/0238052 A1 | 7/2022 | Vitiello et al. | |
| 2022/0358800 A1* | 11/2022 | Ham | G06V 20/584 |

FOREIGN PATENT DOCUMENTS

| | | |
|---|---|---|
| CN | 304613845 | 5/2018 |
| EP | 2605459 A1 | 6/2013 |
| JP | 2003-151081 A | 5/2003 |
| JP | 2004-038672 A | 2/2004 |
| JP | 2004-078639 A | 3/2004 |
| JP | 3818127 B2 | 9/2006 |
| JP | 3975380 B2 | 9/2007 |
| JP | 2016-182855 A | 10/2016 |
| KR | 10-2010-0129531 A | 12/2010 |
| KR | 2012-0024135 A | 3/2012 |
| KR | 10-2015-0045962 A | 4/2015 |
| KR | 10 1518140 B1 | 5/2015 |
| KR | 2016-0063474 A | 6/2016 |
| WO | WO 2008/100489 A2 | 8/2008 |
| WO | WO 2018/064532 | 4/2018 |
| WO | WO 2018/125827 | 7/2018 |
| WO | WO 2018/125831 | 7/2018 |

OTHER PUBLICATIONS

U.S. Appl. No. 29/748,123, May 14, 2021, Office Action.
U.S. Appl. No. 15/396,164, Jul. 20, 2021, Office Action.
U.S. Appl. No. 16/424,164, Feb. 5, 2021, Office Action.
U.S. Appl. No. 16/749,798, Feb. 9, 2021, Notice of Allowance.
U.S. Appl. No. 16/424,164, Oct. 29, 2020, Office Action.
U.S. Appl. No. 29/748,123, Jan. 7, 2021, Office Action.
U.S. Appl. No. 15/396,164, Nov. 23, 2020, Office Action.
Examination Report as received in Australian Application 2017336943 dated Dec. 20, 2019.
International Search Report and Written Opinion as received in PCT/2017/054409 dated Jan. 10, 2018.
International Search Report and Written Opinion as received in PCTUS2017068283, dated Apr. 17, 2018.
International Search Report & Written Opinion as received in PCT/US2017/068295 dated Apr. 23, 2018.
Office Action as received in Canadian Application 3,035,259 dated Feb. 20, 2020.
Range: For Youth, apppicker.com [online], released on Apr. 10, 2014, [retrieved on Feb. 6, 2020], retrieved from the Internet <URL: https://www.apppicker.com/apps/853769848/range-for-youth> (Year: 2014).
Examiner's Report as received in Canadian application 174696 dated May 17, 2018.
Examiner's Report as received in Canadian application 174696 dated Feb. 6, 2018.
Examiner's Report as received in Canadian application 181231 dated May 17, 2018.
Examiner's Report as received in Canadian application 181231 dated Feb. 6, 2019.
First Examination Report as received in Indian patent application 293635 dated Jun. 8, 2017.
First Examination Report as received in Indian patent application 293636 dated Jun. 13, 2017.
Office Action as received in Mexican Application MX/f/2017/001364 dated Jul. 20, 2020 [No English translation available].
U.S. Appl. No. 16/424,164, Jun. 29, 2020, Office Action.
U.S. Appl. No. 29/650,461, Feb. 12, 2020, Office Action.
U.S. Appl. No. 29/650,461, May 13, 2020, Notice of Allowance.
U.S. Appl. No. 15/396,417, May 5, 2017, Office Action.
U.S. Appl. No. 15/396,417, Sep. 5, 2017, Office Action.
U.S. Appl. No. 15/396,417, Jun. 14, 2018, Office Action.
U.S. Appl. No. 15/396,417, Jan. 10, 2019, Office Action.
U.S. Appl. No. 15/396,417, Sep. 26, 2019, Office Action.
U.S. Appl. No. 15/396,417, Feb. 11, 2020, Notice of Allowance.
U.S. Appl. No. 15/396,390, Mar. 7, 2019, Office Action.
U.S. Appl. No. 15/396,390, Oct. 8, 2019, Notice of Allowance.
U.S. Appl. No. 15/396,164, Mar. 22, 2019, Office Action.
U.S. Appl. No. 15/396,164, Oct. 31, 2019, Office Action.
U.S. Appl. No. 15/396,164, Apr. 22, 2020, Office Action.
U.S. Appl. No. 29/584,381, Jan. 4, 2019, Restriction Requirement.
U.S. Appl. No. 29/584,381, Apr. 12, 2019, Office Action.
U.S. Appl. No. 29/584,381, Jul. 25, 2019, Notice of Allowance.
U.S. Appl. No. 16/749,798, Oct. 7, 2020, Office Action.
H. A. N. C. Bandara, A Multi-Agent System for Dynamic Ride Sharing, Dec. 28-31, 2009, Fourth International Conference on Industrial and Information Systems, ICIIS 2009 (Year: 2009).
U.S. Appl. No. 15/396,164, Sep. 22, 2022, Notice of Allowance.
U.S. Appl. No. 16/852,253, Jul. 15, 2022, Office Action.
U.S. Appl. No. 15/396,164, Apr. 8, 2022, Office Action.
U.S. Appl. No. 29/713,840, Apr. 5, 2022, Ex Parte Quayle Action.
U.S. Appl. No. 29/713,840, Jun. 14, 2022, Notice of Allowance.
U.S. Appl. No. 17/343,419, Jun. 20, 2022, Office Action.
U.S. Appl. No. 14/880,042, Jun. 23, 2016, Office Action.
U.S. Appl. No. 14/880,042, Nov. 29, 2016, Office Action.
U.S. Appl. No. 14/880,042, Apr. 19, 2017, Notice of Allowance.

(56) References Cited

OTHER PUBLICATIONS

U.S. Appl. No. 15/680,571, Apr. 2, 2018, Office Action.
U.S. Appl. No. 15/680,571, Aug. 14, 2018, Notice of Allowance.
U.S. Appl. No. 16/171,860, Aug. 19, 2019, Office Action.
U.S. Appl. No. 16/171,860, Nov. 19, 2019, Notice of Allowance.
U.S. Appl. No. 16/171,860, Dec. 30, 2019, Office Action.
U.S. Appl. No. 16/171,860, Jun. 30, 2020, Office Action.
U.S. Appl. No. 16/171,860, Sep. 21, 2020, Office Action.
U.S. Appl. No. 16/171,860, Jan. 12, 2021, Office Action.
U.S. Appl. No. 16/171,860, Feb. 11, 2022, Office Action.
U.S. Appl. No. 16/171,860, May 17, 2022, Notice of Allowance.
U.S. Appl. No. 17/822,665, Jan. 13, 2023, Office Action.
U.S. Appl. No. 16/852,253, Feb. 28, 2023, Office Action.
U.S. Appl. No. 29/747,914, Feb. 27, 2023, Office Action.
U.S. Appl. No. 16/852,253, Nov. 1, 2022, Office Action.
U.S. Appl. No. 17/343,419, Nov. 8, 2022, Office Action.
U.S. Appl. No. 29/747,914, Dec. 5, 2022, Restriction Requirement.
U.S. Appl. No. 17/343,419, Mar. 15, 2023, Notice of Allowance.
U.S. Appl. No. 29/747,914, Apr. 12, 2023, Notice of Allowance.
U.S. Appl. No. 17/822,665, May 30, 2023, Office Action.
U.S. Appl. No. 16/424,164, dated Jun. 23, 2023, Office Action.
U.S. Appl. No. 16/852,253, dated Jul. 3, 2023, Office Action.
U.S. Appl. No. 17/822,665, dated Sep. 11, 2023, Notice of Allowance.
Notice of Allowance as received in MX application MX/a/2019/003642 dated Nov. 21, 2023.
U.S. Appl. No. 16/424,164, dated Oct. 19, 2023, Notice of Allowance.
U.S. Appl. No. 16/852,253, dated Oct. 12, 2023, Office Action.

\* cited by examiner

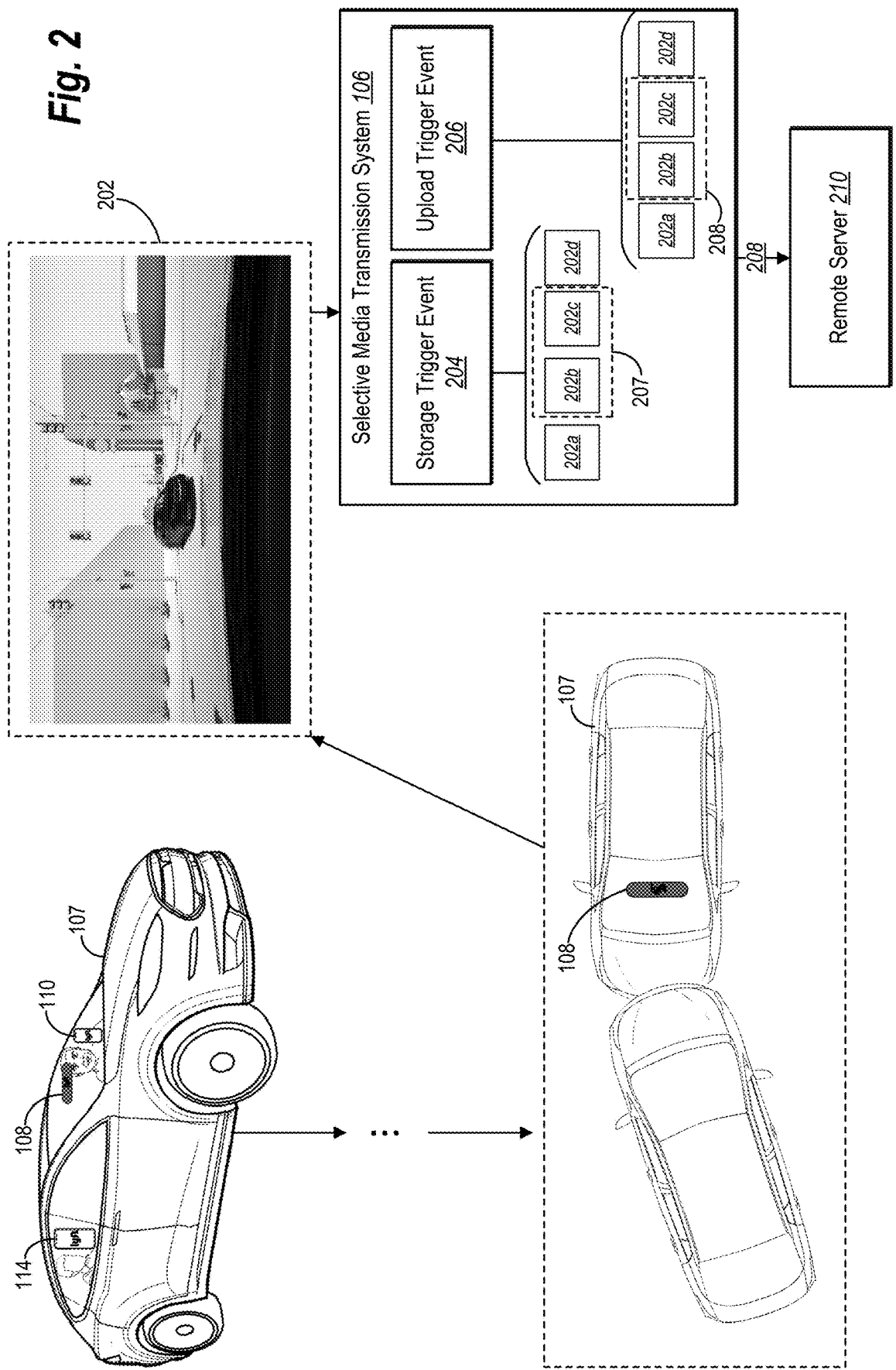

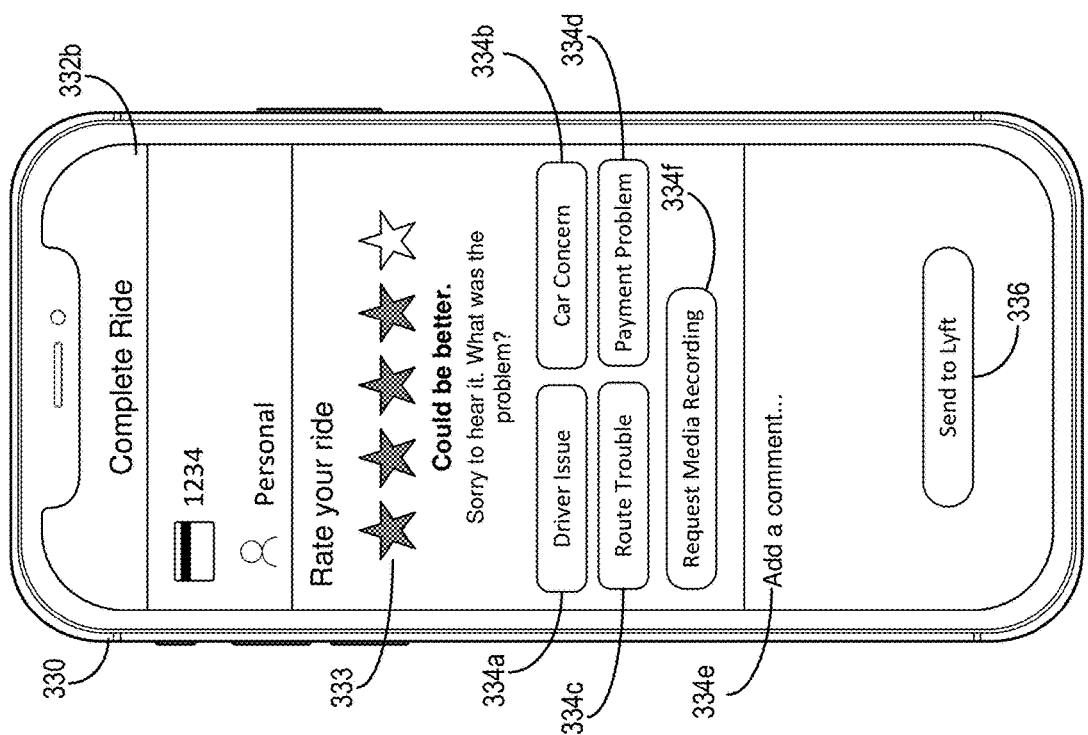
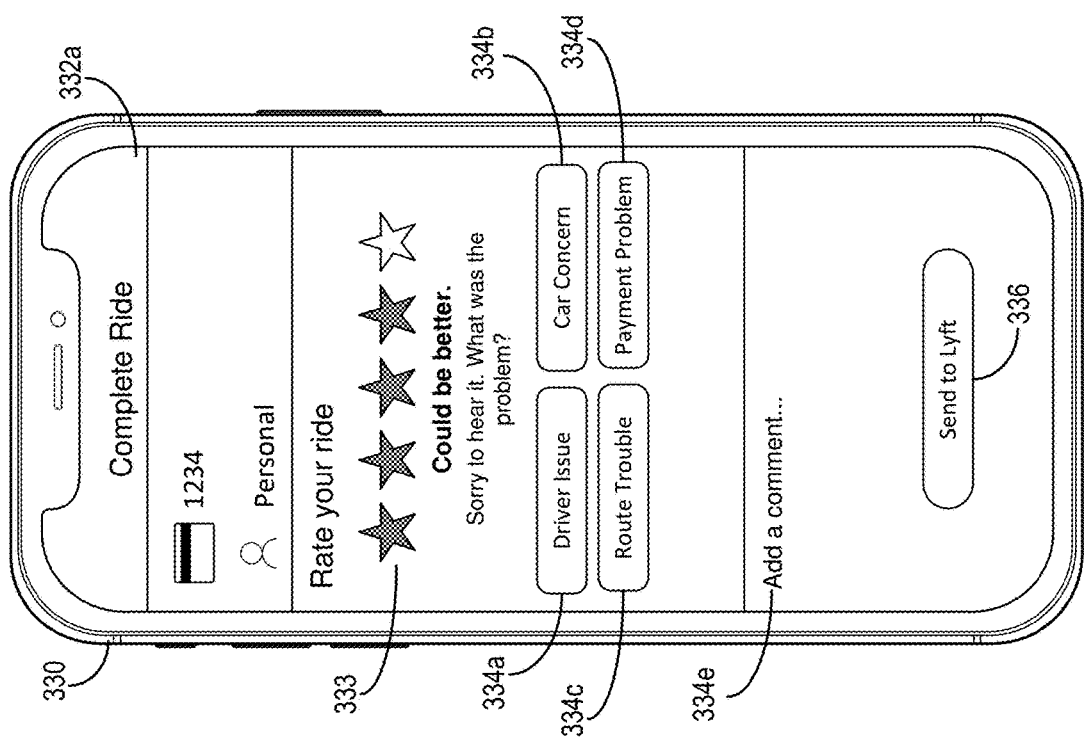
Fig. 3B

UTILIZING AN INTELLIGENT IN-CABIN MEDIA CAPTURE DEVICE IN CONJUNCTION WITH A TRANSPORTATION MATCHING SYSTEM

BACKGROUND

Recent years have seen significant development in transportation matching systems that utilize web and mobile applications to manage real-time on-demand transportation requests from requestor devices. For example, on-demand transportation matching systems can match provider devices with requestor devices to provide transportation across a variety of geographic locations. In some cases, this involves communications from an on-demand transportation matching system via web or mobile applications on a provider device and a requestor device that coordinate various aspects of a transportation service (e.g., a pickup location, a drop-off location, etc.). Although on-demand transportation matching systems can match provider devices and requestor devices, these systems have a number of technical deficiencies in relation to digital security, efficiency, and flexibility.

BRIEF SUMMARY

Embodiments of the present disclosure provide benefits and/or solve one or more of the foregoing or other problems in the art with systems, non-transitory computer-readable media, and methods for improving security, efficiency, and flexibility by utilizing an intelligent in-cabin computing device in conjunction with a transportation matching system. In particular, the disclosed systems can utilize an in-cabin computing device that dynamically captures digital media, monitors a variety of digital signals for analyzing transportation rides, utilizes a 360-degree light configuration to broadcast information to surrounding requestors and requestor devices, implements dead-fronting to improve digital security, and intelligently stores and transmits digital media to remote servers. Indeed, the disclosed systems can implement an in-cabin computing device with a dynamic halo light ring (i.e., a 360-degree light ring that can provide personalized beaconing based on user interaction at a requestor device). Moreover, consistent with user privacy settings and applicable regulations, the disclosed systems can utilize an in-cabin media capture device that analyzes data regarding transportation services to intelligently capture digital media (e.g., store digital media in different memory partitions) and transmit sub-portions of digital media to remote servers for private, secure analysis.

For example, in one or more embodiments, the disclosed systems utilize an in-cabin media capture device to capture and store media recordings in an over-write loop portion of memory. In some embodiments, the disclosed systems can utilize a trigger analysis model to intelligently determine a portion of a media recording to save in a separate storage partition of the in-cabin media capture device and/or to transmit to a remote server. For example, the disclosed systems can utilize the trigger analysis model to analyze various types of transportation data generated by at least one of the in-cabin media capture device, a provider device, or a requestor device to identify certain trigger events that can occur during a transportation service (e.g., a collision event, a transportation irregularity, a confrontation event, provider/requestor media recording requests, etc.). In some implementations, the trigger analysis model analyzes the transportation data to identify a trigger event and, in response, store a specific portion of a media recording in a reserved storage partition of the in-cabin media capture device and selectively upload the media recording portion to a remote server. In some embodiments, a remote server can, in turn, analyze the media recording portion and/or transmit the media recording portion to various devices, such as incident resolution devices, emergency personnel devices, or law enforcement devices.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

FIG. 2 illustrates a selective media transmission system determining a media recording portion from an in-cabin media capture device to store and upload based on a trigger event in accordance with one or more embodiments.

FIG. 3B illustrates a computing device presenting user interfaces for providing a digital incident report in accordance with one or more embodiments.

DETAILED DESCRIPTION

Figure 1:
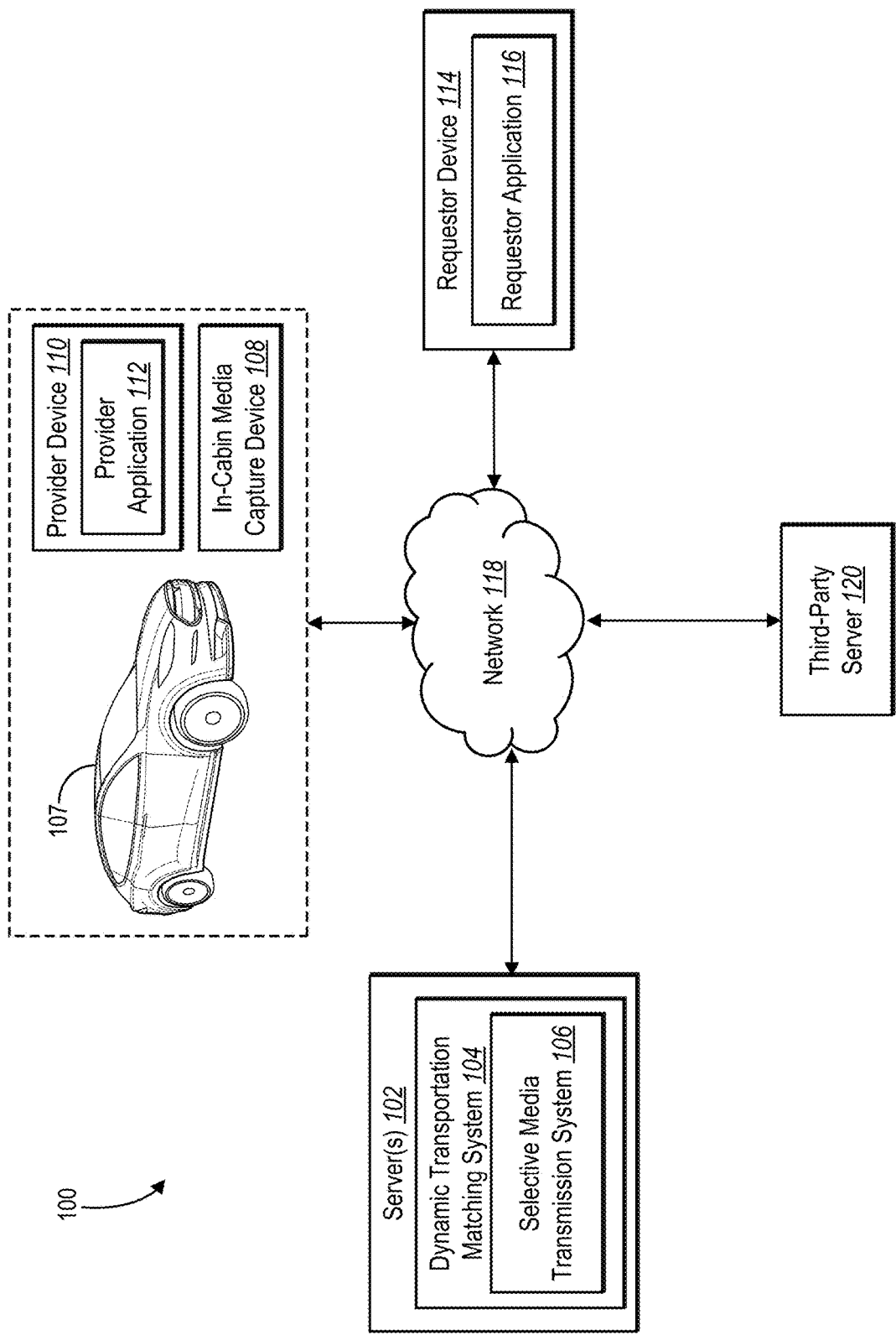
FIG. 1 illustrates a diagram of a system including a selective media transmission system in accordance with one or more embodiments.

This disclosure describes one or more embodiments of a transportation matching system and selective media transmission system that utilize an in-cabin computing device to improve the security, efficiency, and flexibility of implementing computing devices. For example, the transportation matching system can utilize an in-cabin computing device that includes a 360-degree halo light ring to dynamically and efficiently align requestor devices and provider devices at a pick-up location. Moreover, the transportation matching system can utilize the in-cabin computing device to more accurately monitor a variety of digital signals associated with transportation services, including global position system information, dead-reckoning data, inertial measurement signals, audio signals, media recordings, and/or light sensors. Furthermore, the selective media transmission system can utilize a trigger analysis model in conjunction with these digital signals to intelligently identify upload trigger events and storage trigger events. In particular, based on upload trigger events and/or storage trigger events, the selective media transmission system can selectively store a media recording at an in-cabin media capture device and/or transmit portions of the media recording to a remote server for private, secure analysis and processing.

As mentioned above, consistent with user privacy settings and applicable regulations, the selective media transmission system can utilize an in-cabin media capture device to capture a variety of digital signals, including a media recording of a transportation service. For example, in one or more embodiments, the in-cabin media capture device comprises a dash or window-mounted computing device with a variety of sensors, including a forward-facing digital camera, a rear-facing digital camera, an inertial measurement unit, a GPS sensor, a gyroscope, a magnetometer, and/or a light sensor. The in-cabin media capture device can detect privacy settings of provider devices and/or requestor devices and (consistent with these privacy settings) capture digital signals during a transportation ride. For example, the in-cabin media capture device can capture and record digital video portraying events within and outside a transportation vehicle.

In one or more embodiments, the selective media transmission system utilizes a trigger analysis model to determine portions of a media recording to store at the in-cabin media capture device and portions to upload to a remote server. Indeed, storing and/or transmitting captured media items can consume excessive memory, bandwidth, and processing resources of the in-cabin media capture device and corresponding systems. Accordingly, the selective media transmission system can preserve computer resources by utilizing a trigger analysis model to intelligently identify trigger events and corresponding portions of media recordings to store and/or transmit to remote servers.

For example, the selective media transmission system can utilize a trigger analysis model that comprises heuristic algorithms and/or machine-learning models that analyze transportation service data to identify trigger events. To illustrate, the selective media transmission system can utilize the trigger analysis model to identify trigger events by analyzing transportation service data generated from at least one of an in-cabin media capture device, a provider device, a requestor device, and/or a third-party device. Transportation service data may include telematics data (e.g., motion data, GPS data, audio data, etc.), digital incident reports from provider/requestor devices (or other third-party devices such as pedestrian devices), and/or third-party data such as traffic data, weather data, law enforcement data, etc. For example, to detect a collision trigger event, the selective media transmission system can analyze motion signals (e.g., from the in-cabin media capture device) to identify a sharp change in velocity, inertia, etc. indicating a potential collision.

In response to detecting a trigger event identified by the trigger analysis model, the selective media transmission system can determine a portion of a media recording to store at the in-cabin media capture device and/or to upload to a remote server. For example, the selective media transmission system can determine a timestamp in the media recording that corresponds to the trigger event. Depending on the trigger event detected, the selective media transmission system can identify a media duration as a relevant timeframe in the media recording relative to the timestamp. Then, to determine the media recording portion, the selective media transmission system utilize the media duration to isolate the portion of the media recording surrounding the relevant timestamp.

In some embodiments, the selective media transmission system stores media recording in a memory partition at the in-cabin media capture device that is set to overwrite after some overwrite looping duration. However, after detecting a storage trigger event based on transportation service data and determining a portion of a media recording, the selective media transmission system can instruct the in-cabin media capture device to store the portion of the media recording corresponding to the storage trigger event in another memory partition of the in-cabin media capture device (e.g., that is not set to overwrite after the overwrite looping duration). Accordingly, based on a storage trigger event, the selective media transmission system can securely store the media recording portion that pertains to the storage trigger event while continuing to over-write other portions of a media recording (and, thus, preserve in-cabin media capture device storage resources).

Additionally or alternatively, the selective media transmission system can upload the media recording portion to a remote server in response to detecting an upload trigger event. For example, in response to detecting an upload trigger event, the selective media transmission system can cause the in-cabin media capture device to upload a portion of a media recording to a remote server for a secure, private digital analysis. To illustrate, in some embodiments, the selective media transmission system provides a portion of a media recording corresponding to a trigger event to a third-party server (e.g., a separate system operated by an independent third party). The third-party server can analyze the portion of the media recording utilizing a machine learning model to determine whether any further action is necessary. For example, consistent with privacy permissions and applicable regulations, the third-party server can provide the portion of the media recording to a requestor device or provider device, to a law enforcement device (e.g., to address possible criminal activity), to an incident resolution partner device (e.g., to address a dispute regarding a collision), or to the transportation matching system (e.g., to address inappropriate behavior by a provider).

In some embodiments, the selective media transmission system anonymizes digital media to further improve security of implementing devices. For example, the selective media transmission system causes the in-cabin media capture device to blur identifying features from a media recording. In particular, prior to storage and/or transmission of the media recording, the in-cabin media capture device can blur faces, nametags, or other identifying features in a digital image or digital video. To do so, the selective media transmission system can utilize a machine-learning model trained to identify features of a digital image or a digital video and then the selective media transmission system can apply privacy protection modifications to the identified features. For example, the selective media transmission system can utilize a machine-learning model that applies an object detection algorithm to identify a subset of pixels and apply one or more corresponding modifications. Such modifications may include, for instance, blending one or more pixels of the subset of pixels together to make the blended pixels, as a whole, depict incomprehensible or unidentifiable content.

As mentioned above the in-cabin computing device can include a variety of other features. For example, the in-cabin computing device can include a 360-degree halo light ring to dynamically and efficiently align requestor devices and provider devices at a pickup location. In so doing, the in-cabin computing device can provide increased visibility (including improved day-time visibility) of the in-cabin computing device at pickup. In addition, the in-cabin computing device may present personalized beaconing (e.g., a light pulse coinciding with user interaction at a requestor device) via the 360-degree halo light ring and/or a dynamic front-display. Moreover, the selective media transmission system can utilize the in-cabin computing device to more accurately monitor a variety of digital signals associated with transportation services, including global position system information, dead-reckoning data, inertial measurement signals, audio signals, media recordings, and/or light sensors. Furthermore, in some embodiments, the in-cabin computing device implements a dead-fronting approach that limits functionality (e.g., turns of the halo light ring, beaconing, transmissions, or other features) without an authorized provider or provider device.

As briefly mentioned above, a number of technical problems exist with conventional systems, particularly in relation to digital security, efficiency, and flexibility of implementing computing devices. For example, conventional systems often face technical concerns with regard to digital security. To illustrate, providing transportation services can result in collisions, confrontations, or other adverse events, and some conventional systems seek to monitor and address these events by using computing devices to record a transportation service. This approach, however, raises digital privacy and security concerns, as computing devices storing digital video of transportation services may be subject to hacking, piracy, and/or manipulation to gain access to digital video of private rides.

In addition, recording transportation services can be inefficient. For example, recording, storing, and transmitting in-ride video of transportation services leads to excessive use of network bandwidth, storage, and computational resources. Indeed, for a single driver device, storing digital video of numerous transportation rides can require hundreds of gigabytes of storage resources (which can quickly exhaust local hard drives) and can overwhelm transmission bandwidth if transmitted to other devices. Compounded by hundreds of thousands of provider devices and requestor devices, in-ride video recording often exhausts the computing capabilities of many systems and network connections. As a result, many conventional systems take a rigid approach and do not capture digital media or provide resources for digital security of transportation services.

In addition, conventional systems are often inefficient in aligning provider devices and requestor devices at pickup locations. To illustrate, matched providers and requestors often have difficulty identifying one another to begin transportation services. This often results in driver devices and requestor devices wasting additional time and computing resources to service a transportation request. For example, requestor devices and provider devices often consume excessive resources in repeatedly downloading and analyzing digital maps generated from global positioning system to identify a matched provider device/requestor device at a particular pick-up location. Moreover, difficulty in aligning provider devices and requestor devices at pick-up locations often leads to digital cancellations of transportation requests, which imposes additional computational resources in matching new provider devices and requestor devices (e.g., processing cancellation requests, transmitting notifications to the appropriate devices, identifying a new match between requestor devices and provider devices, identifying a pick-up location, guiding devices to the pick-up location, etc.).

In view of the foregoing, the disclosed transportation matching system and corresponding selective media transmission system can provide several technical advantages relative to conventional systems in relation to digital security, efficiency, and flexibility. For example, the selective media transmission system can improve data security, and/or data privacy relative to conventional systems. Indeed, the selective media transmission system can utilize an in-cabin media capture device to selectively capture digital recordings that reflect notable events during transportation services. For example, the selective media transmission system can intelligently and selectively store and/or transmit portions of a media recording that reflect collisions or transportation irregularities while maintaining privacy and digital security.

In particular, the selective media transmission system can use an in-cabin media capture device (separate from a computing device owned by a driver), where the data of the in-cabin media capture device is not directly accessible to providers or riders. To illustrate, in some embodiments, the selective transmission system utilizes an in-cabin media capture device equipped with encryption and/or other security protocols to help prevent loss, alteration, breach, or theft of data associated with a media recording. The selective transmission system can also anonymize media recordings to further improve digital privacy and security of captured media recordings. Moreover, in some embodiments, the selective transmission system only provides portions of digital media recordings to secure, third-party remote servers (e.g., separate and distinct from the transportation matching system). Thus, although the selective media transmission system can capture digital media recordings, in one or more embodiments, this data is inaccessible to providers, riders, and the transportation matching system itself. In this manner, the selective media transmission system can improve safety and monitoring of events while also preserving digital security. Moreover, by selectively storing or transmitting only portions of a media recording, the selective transmission system can reduce the amount of private data and associated avenues for digital privacy or security breaches.

In addition, the selective media transmission system can also improve efficiency. For example, the selective media transmission system can utilize a trigger analysis model to determine portions of media recordings to store and/or transmit to remote servers. Specifically, the selective media transmission system can utilize the trigger analysis model to identify a storage trigger event and/or an upload trigger event which can cause storage and/or transmission of a portion of a media recording. In the event that the selective media transmission system detects no storage trigger event or trigger upload event, the selective media transmission system can forego long term storage (e.g., over-write captured digital video to conserve storage resources) or transmission. In addition, selectively uploading a media recording reduces the volume of media recordings that need to be stored, analyzed, or processed at remote servers. Thus, the selective media transmission system can selectively identify portions of digital media to store, upload, and process. In this manner, the selective media transmission system can decrease burdens on storage resources, network bandwidth, and processing resources.

Further, the transportation matching system can improve efficiency of aligning requestor devices and provider devices at pick-up locations. For example, as mentioned above, the transportation matching system can utilize an in-cabin computing device that includes a 360-degree halo light ring that broadcasts information to requestors and requestor devices. To illustrate, the in-cabin computing device can broadcast different colors or strobing lights in a 360-degree arc (in front of, behind, or next to a provider vehicle) to allow a requestor to recognize a particular provider. Furthermore, based on interaction at requestor devices, the transportation matching system can dynamically modify the halo light of the in-cabin computing device to allow the requestor to more efficiently identify the provider. For example, the requestor can interact with the requestor device to modify color, brightness of the light halo of the in-cabin computing device to efficiently identify the provider through personalized beaconing. Utilizing this approach, the transportation matching system can significantly reduce the time and computing resources utilized to align provider devices and requestor devices at pick-up locations. Indeed, the transportation matching system can utilize the in-cabin computing device to reduce cancellation and corresponding computing resources needed to match provider devices and requestor devices.

In some embodiments, the transportation matching system further improves security by utilizing an in-cabin media device that implements dead-fronting. In particular, the transportation matching system can utilize an in-cabin media device that prohibits beaconing or other transmissions from the in-cabin media device without an authorized provider or provider device. For example, the transportation matching system can shut down an in-cabin media device, a halo light arrangement, or other transmission services (e.g., a BluTooth or cellular data connections) in the absence of a provider device (e.g., when a provider device is not connected, logged in, or connected to the in-cabin computing device). In this manner, the transportation matching system can reduce security concerns associated with unauthorized users (impersonators) accessing or utilizing in-cabin computing devices (e.g., to initiate unauthorized transportation services).

As illustrated by the foregoing discussion, the present disclosure utilizes a variety of terms to describe features and benefits of the selective media transmission system. Additional detail is now provided regarding the meaning of these terms. For example, as used herein, the term "in-cabin media capture device" (or "in-cabin computing device") refers to a computing device associated with a transportation provider and/or a transportation vehicle. In particular, an in-cabin media capture device can include a computing device within a cabin of a transportation vehicle (e.g., mounted to the dash or front windshield of the transportation vehicle). However, in some implementations, the in-cabin media capture device includes one or more sensors or devices mounted externally to a transportation vehicle, in which case the in-cabin media capture device is not limited to the spatial confines of an interior cabin of a transportation vehicle. As discussed in greater detail below, an in-cabin media capture device can include one or more digital cameras for capturing a "media recording" (i.e., digital images, digital video, and/or digital audio in and/or around a vehicle) during a transportation service. The in-cabin media capture device can include a camera in addition to various sensors or devices (e.g., a microphone, an accelerometer, an inertial measurement unit, a global position system (GPS) device, a network connection device for a cellular connection or BlueTooth® connection, a photodetector, etc.).

Additionally, the in-cabin media capture device can include a memory device comprising one or more "memory partitions" (i.e., discrete storage spaces or portions of memory storage). For example, an in-cabin media capture device can store a media recording in a first memory partition that is set to overwrite after a "predetermined overwrite looping duration" (i.e., a period of time allotted between memory overwrites, erasures, resets, etc. of a memory device) as described more below in relation to FIG. 4. As another example, an in-cabin media capture device can store a media recording portion in a second memory partition (e.g., a memory partition that will not overwrite after a predetermined overwrite looping duration). In some embodiments, the in-cabin media capture device can further include various display features, mounting configurations, security protocols, etc. described more below in relation to FIGS. 6A-6B (e.g., personalized beaconing, a halo light ring, adjustable lumen output, authenticatable displays, etc.).

As further used herein, the term "trigger event" refers to a detected occurrence or incident corresponding to storage or transmission of digital data. For instance, a trigger event can include a data-indicated occurrence of an incident (relating to a transportation service) that triggers storage or transmission of a media recording (or a portion of a media recording). A trigger event can include an upload trigger event and/or a storage trigger event. For example, the selective media transmission system may identify a trigger event that comprises an upload trigger event, and in response, initiate an upload of a media recording portion to a remote server (e.g., a third-party server or a dynamic transportation matching server). As another example, the selective media transmission system may identify a trigger event that comprises a storage trigger event, and in response, initiate storage of a media recording portion at an in-cabin media capture device. In some embodiments, an upload trigger event and a storage trigger event are the same event (albeit not necessarily). Additionally, in some implementations, a trigger event may include, for example, a collision event (e.g., a crash involving the transportation vehicle), a reckless driving event (e.g., dangerous, erratic, impaired, or illegal driving behavior), a confrontation event (e.g., an altercation, yelling, profane language, hate speech, sexual advances, etc.), a transportation irregularity (e.g., unscheduled stops, different travel routes, missed pickup/drop-off locations, unusual delays, etc.), and the like.

To identify a trigger event, the selective media transmission system can utilize a media recording and/or data associated with a transportation service. Data associated with a transportation service (i.e., "transportation service data") can include various forms of telematics data, for example, motion signals (e.g., measurements of velocity, direction, position change, acceleration, inertia, etc.), GPS data (e.g., GPS coordinates), transportation time data (e.g., a duration of time for a transportation service, whether elapsed, remaining, or predicted), anticipated transportation patterns (e.g., an expected or navigationally-instructed travel route or travel duration), audio data (e.g., spoken words, auditory sounds, and/or audio signals comprising frequency, pitch, amplitude, tone, etc.), and the like. In addition, the transportation service data can include timestamped data such that the selective media transmission system can accurately identify when a trigger event occurred and correlate to a timestamp of a media recording. Further, in some embodiments, transportation service data can include digital incident reports from provider/requestor devices (or other third-party devices such as pedestrian devices, collision witness devices, emergency/law enforcement devices, etc.). Additionally, in some implementations, transportation service data can include third-party data such as traffic data, weather data, law enforcement data, etc.

As used herein, the term "timestamp" refers to a temporal instance in time, (e.g., 3:06 pm, 15:06:45 pm, or other suitable formats), a length of time (e.g., forty-five seconds), or a temporal instance in memory storage (e.g., at a 32 minute and 18 second mark of a media recording). In some embodiments, the selective media transmission system can determine a timestamp of a media recording that corresponds to an identified trigger event. Based on the identified trigger event, in some embodiments, the selective media transmission system can determine a portion of a media recording that is relevant to the identified trigger event by applying a "media duration" (i.e., a period of time in relation to a media recording) to a timestamp of the media recording. In these or other embodiments, a media duration can vary in length, depending on the identified trigger event. For example, trigger events of a more serious or important nature, such as provider/requestor safety, can merit a larger media duration than other types of trigger events. Additionally or alternatively, for instance, trigger events based on events arising out of a short sequence of events (such as a requestor exiting the vehicle) may merit a smaller media duration in comparison to other trigger events.

In addition, as used herein, the term "machine-learning model" refers to a computer-implemented model that can be tuned (e.g., trained) based on inputs to approximate unknown functions. In particular, a machine-learning model can learn to approximate complex functions and generate outputs based on inputs provided to the model. For instance, the disclosure describes in more detail below in relation to FIG. 3A a trigger analysis model that in some embodiments comprises a machine-learning model trained to identify a trigger event based on transportation service data and/or a media recording. These and other machine-learning models can include, for example, logistic regression, decision trees, naïve Bayes, neural networks, long-short term memory, random forests, gradient boosting models, deep learning architectures, classifiers, etc.

As further used herein, the term "provider device" refers to a computing device associated with a transportation provider and/or transportation vehicle. Similarly, the term "requestor device" refers to a computing device associated with a transportation request for a transportation service and/or a requesting individual thereof.

Additional detail will now be provided in relation to illustrative figures portraying example embodiments and implementations of a selective media transmission system. For example, FIG. 1 illustrates a computing system environment (or "environment") 100 for implementing a selective media transmission system 106 in accordance with one or more embodiments. As shown in FIG. 1, the environment 100 includes server(s) 102, a vehicle 107, an in-cabin media capture device 108, a provider device 110, a requestor device 114, a network 118, and a third-party server 120. Each of the components of the environment 100 can communicate via the network 118, and the network 118 may be any suitable network over which computing devices can communicate. Example networks are discussed in more detail below in relation to FIG. 9.

As shown in FIG. 1, the environment 100 includes the vehicle 107 for performing a transportation service, namely transporting the requestor device 114 across a geographic area from a pickup location to a drop-off location. In particular, the vehicle 107 comprises the in-cabin media capture device 108, which generates media recordings of each transportation service involving the transport of the requestor device 114. In some embodiments, the in-cabin media capture device 108 can upload, via the network 118, one or more portions of a media recording to various components of the environment 100, for example, to the third-party server 120, the server(s) 102, etc. as instructed by the selective media transmission system. Additionally or alternatively, the in-cabin media capture device 108 can store one or more portions of a media recording in a memory partition of the in-cabin media capture device 108 reserved for potential uploads and/or a review process. In these or other embodiments, the in-cabin media capture device 108 can upload and/or store a media recording portion in response to the selective media transmission system identifying a trigger event, for example, as described more below in relation to FIG. 2, FIGS. 3A-3B, and FIG. 4.

As also shown in FIG. 1, the environment 100 includes the provider device 110 and the requestor device 114. The provider device 110 and the requestor device 114 can each be one of a variety of computing devices, including a smartphone, tablet, smart watch, smart television, desktop computer, laptop computer, virtual reality device, augmented reality device, or other computing device as described in relation to FIG. 9. Additionally or alternatively, in some embodiments, the provider device 110 is attached to (or integrated within) the vehicle 107 (e.g., an autonomous transportation vehicle). Furthermore, FIG. 1 illustrates a single provider device 110 and a single requestor device 114. However, in some embodiments the environment 100 can include multiple provider devices 110 and/or multiple requestor devices 114.

In addition, the provider device 110 and the requestor device 114 can further communicate with the server(s) 102, including the dynamic transportation matching system 104 and the selective media transmission system 106 via the network 118. For example, in response to transportation requests from the requestor device 114, the dynamic transportation matching system 104 can communicate with the provider device 110 and/or the requestor device 114 via the network 118 to provide various communications (e.g., regarding a media recording request, matching, pickup, etc.).

As shown, the provider device 110 and the requestor device 114 include corresponding dynamic transportation matching applications referred to as a provider application 112 and a requestor application 116. In particular, the provider application 112 and the requestor application 116 may be a web application, a native application respectively installed on the provider device 110 and the requestor device 114 (e.g., a mobile application, a desktop application, etc.), or a cloud-based application where part of the functionality is performed by the server(s) 102. The provider application 112 and the requestor application 116 can present or display information to users respectively associated with the provider device 110 and the requestor device 114, including information relating to transportation requests, matching, pickup, etc. as described in more detail below.

As an example, the provider application 112 can cause the provider device 110 to communicate with the dynamic transportation matching system 104 for receiving instructions regarding navigation to a pickup location to pick up a requestor. As another example, the requestor application 116 can cause the requestor device 114 to communicate with the in-cabin media capture device 108 to present a personalized pickup beacon at the in-cabin media capture device 108 upon pickup. In yet another example, the requestor application 116 can cause the requestor device 114 to communicate with the selective media transmission system 106 to request a media recording portion generated at the in-cabin media capture device 108 be reviewed.

As illustrated in FIG. 1, the environment 100 includes the server(s) 102. The server(s) 102 may execute, generate, store, receive, and transmit electronic data, such as executable instructions for matching provider devices and requestor devices, generating a media recording, identifying a trigger event, determining a media recording portion corresponding to a trigger event, storing a media recording portion, uploading a media recording portion, etc. For example, the server(s) 102 may receive a transportation request from the requestor device 114 and, in turn, navigate the provider device 110 matched thereto to a pickup location for picking up the requestor device 114. During transport of the requestor device 114 to a drop-off location (or alternatively, sometime after completion of the transportation service), the server(s) 102 may receive a digital incident report requesting a media recording for the transportation service. In response, the server(s) 102 can instruct the selective media transmission system 106 to selectively determine a media recording portion for storage at the in-cabin media capture device 108 and/or for uploading to a remote server (e.g., the third-party server 120). In some embodiments, the server(s) 102 comprises a distributed server where the server(s) 102 includes a number of server devices distributed across the network 118 and located in different physical locations. The server(s) 102 can comprise a content server, an application server, a social networking server, a communication server, a web-hosting server, or a machine learning server.

As further shown in FIG. 1, the environment 100 includes the third-party server 120. The third-party server 120 can exchange digital data with one or more components of the environment 100. For example, in some embodiments, the in-cabin media capture device 108 and/or the server(s) 102 can upload a media recording portion to the third-party server 120 to perform a secure third-party analysis. Further, in some embodiments, the third-party server 120 may transmit one or more aspects of the uploaded/reviewed media recording portion to components in the environment 100 (e.g., to the server(s) 102 according to privacy policy terms). Additionally or alternatively, the third-party server 120 may transmit one or more aspects of the media recording portion to components not illustrated in the environment 100 (e.g., incident resolution partner devices, emergency personnel devices, law enforcement devices, etc. as described further below in relation to FIG. 5). Additionally or alternatively, in some embodiments, the third-party server 120 can provide transportation service data to the selective media transmission system 106 for identification of a trigger event. Examples of such transportation service data from the third-party server 120 may include weather data (e.g., indicative of icy road conditions), traffic data (e.g., accident reports or data indicative of stop-and-go traffic and therefore increased collision probabilities), law enforcement data (e.g., indications of reckless driving or data indicative of excess traffic violations and therefore increased reckless driving probabilities), and the like. In these or other embodiments, the third-party server 120 comprises a content server and/or a data collection server. Additionally or alternatively, the third-party server 120 can comprise an application server, a communication server, a web-hosting server, a social networking server, a monitoring server, or a digital content management server.

Although FIG. 1 depicts the selective media transmission system 106 located on the server(s) 102, in some embodiments, the selective media transmission system 106 may be implemented by one or more other components of the environment 100 (e.g., by being implemented entirely or in part at one or more of the other components). For example, the selective media transmission system 106 may be implemented in whole, or in part, by the in-cabin media capture device 108, provider device 110, the requestor device 114, and/or the third-party server 120. In another example implementation, the selective media transmission system 106 may perform one or more acts of the present disclosure described in conjunction with the dynamic transportation matching system 104. Additionally, or alternatively, the dynamic transportation matching system 104 may perform one or more acts of the present disclosure described in conjunction with the selective media transmission system 106.

As shown in FIG. 1, the selective media transmission system 106 is implemented as part of a dynamic transportation matching system 104 located on the server(s) 102. The dynamic transportation matching system 104 can organize, manage, and/or execute matching the provider device 110 with the requestor device 114. As another example, the dynamic transportation matching system 104 can utilize the selective media transmission system 106 to analyze transportation service data and identify a trigger event. Additionally or alternatively, the dynamic transportation matching system 104 can provide the selective media transmission system 106 with a type of ground-truth-transportation-service data (e.g., an anticipated transportation pattern) by which the selective media transmission system 106 can identify a trigger event, such as a transportation irregularity described more below in relation to FIG. 3A.

Although not illustrated in FIG. 1, in some embodiments, the environment 100 may have a different arrangement of components and/or may have a different number or set of components altogether. For example, in some embodiments, a third-party device such as a pedestrian device or an additional provider/requestor device may provide transportation service data to the selective media transmission system 106 (e.g., in a same or similar manner as described more below in relation to FIG. 3A). In response, the selective media transmission system 106 may identify a trigger event and correspondingly provide storage and/or upload instructions regarding a media recording portion to the in-cabin media capture device 108.

As another example, in certain implementations, the provider device 110 is associated with the vehicle 107 as an autonomous transportation vehicle—that is, a self-driving vehicle that includes computer components and accompanying sensors for driving without manual-provider input from a human operator. As a further example, in some embodiments, one or more of the provider device 110 include a hybrid self-driving vehicle with both self-driving functionality and some human operator interaction.

In embodiments where the provider device 110 is an autonomous vehicle or a hybrid self-driving vehicle, the provider device 110 may further include additional components not depicted in FIG. 1. Such components may include location components, one or more sensors by which the autonomous vehicle navigates, and/or other components necessary to navigate without a provider (or with minimal interactions with a provider). Additionally, or alternatively, the provider device 110 may be subcomponents of a vehicle computing system. Regardless of its form, the provider device 110 may include various sensors, such as a GPS locator, an inertial measurement unit, an accelerometer, a gyroscope, a magnetometer, and/or other sensors, from which the dynamic transportation matching system 104 can access information, such as location data.

As mentioned above, the selective media transmission system 106 can identify a trigger event and determine a corresponding media recording portion captured by an in-cabin media capture device. FIG. 2 illustrates the selective media transmission system 106 determining a media recording portion from the in-cabin media capture device 108 to store and upload based on a trigger event in accordance with one or more embodiments. In particular, FIG. 2 depicts a transportation service involving the vehicle 107 with the in-cabin media capture device 108, the provider device 110, and the requestor device 114. During the transportation service, the in-cabin media capture device 108 generates a media recording. In addition, during the transportation service, the vehicle 107 collides with another vehicle, which the in-cabin media capture device 108 captures in a media recording 202.

In turn, the selective media transmission system 106 can obtain the media recording 202 from the in-cabin media capture device 108. Additionally or alternatively, at least one of the in-cabin media capture device 108, the provider device 110, or the requestor device 114 can provide the selective media transmission system 106 with transportation service data (e.g., motion data). Given the transportation service data and/or the media recording 202, the selective media transmission system 106 can perform (e.g., in real-time) a trigger event analysis to identify a storage trigger event 204 and an upload trigger event 206 as described more below in relation to FIG. 3A. In some implementations, the storage trigger event 204 and the upload trigger event 206 may be the same trigger event, which in the case of FIG. 2 comprises a collision event.

Based on the trigger event analysis and identification of the storage trigger event 204 and the upload trigger event 206, the selective media transmission system 106 can determine specific portions of the media recording 202 to store at the in-cabin media capture device 108 (e.g., as described more below in relation to FIG. 4) and specific portions of the media recording 202 to upload to a remote server 210 (e.g., as described more below in relation to FIG. 3A). That is, the media recording 202 can include various portions 202*a*-202*d* (e.g., video frames, video segments, etc.) comprising a visual record of events occurring before, during, and/or after the storage trigger event 204 and the upload trigger event 206.

Thus, to conserve storage space at the in-cabin media capture device 108 and also to reduce network bandwidth consumption and increase transmission speeds for uploading, the selective media transmission system 106 can selectively choose the relevant portions of the media recording 202 to store and upload. Accordingly, based on a temporal relationship to the storage trigger event 204, the selective media transmission system 106 can select a media recording portion 207 comprising portions 202*b*-202*c* to store at the in-cabin media capture device 108 in a reserved memory partition. Similarly, based on a temporal relationship to the upload trigger event 206, the selective media transmission system 106 can select a media recording portion 208 comprising portions 202*b*-202*c* to upload to the remote server 210. In turn, the selective media transmission system 106 can instruct the in-cabin media capture device 108 to store the media recording portion 207, and the selective media transmission system 106 can upload the media recording portion 208 to the remote server 210. In these or other embodiments, the media recording portion 207 and the media recording portion 208 may be the same, while in other embodiments different, depending on the corresponding trigger event.

As mentioned above, at least one of a provider device, a requestor device, or an in-cabin media capture device can collect/generate transportation service data. Additionally, during the transportation service, an in-cabin media capture device can generate a media recording. In turn, the selective media transmission system 106 can utilize transportation service data and/or a media recording to identify a trigger event and correspondingly upload a media recording portion. FIG. 3A illustrates the selective media transmission system 106 utilizing a trigger analysis model 302 to analyze transportation service data and/or a media recording to identify a media recording portion 306 for uploading to a remote server 308 in accordance with one or more embodiments.

Figure 3A:
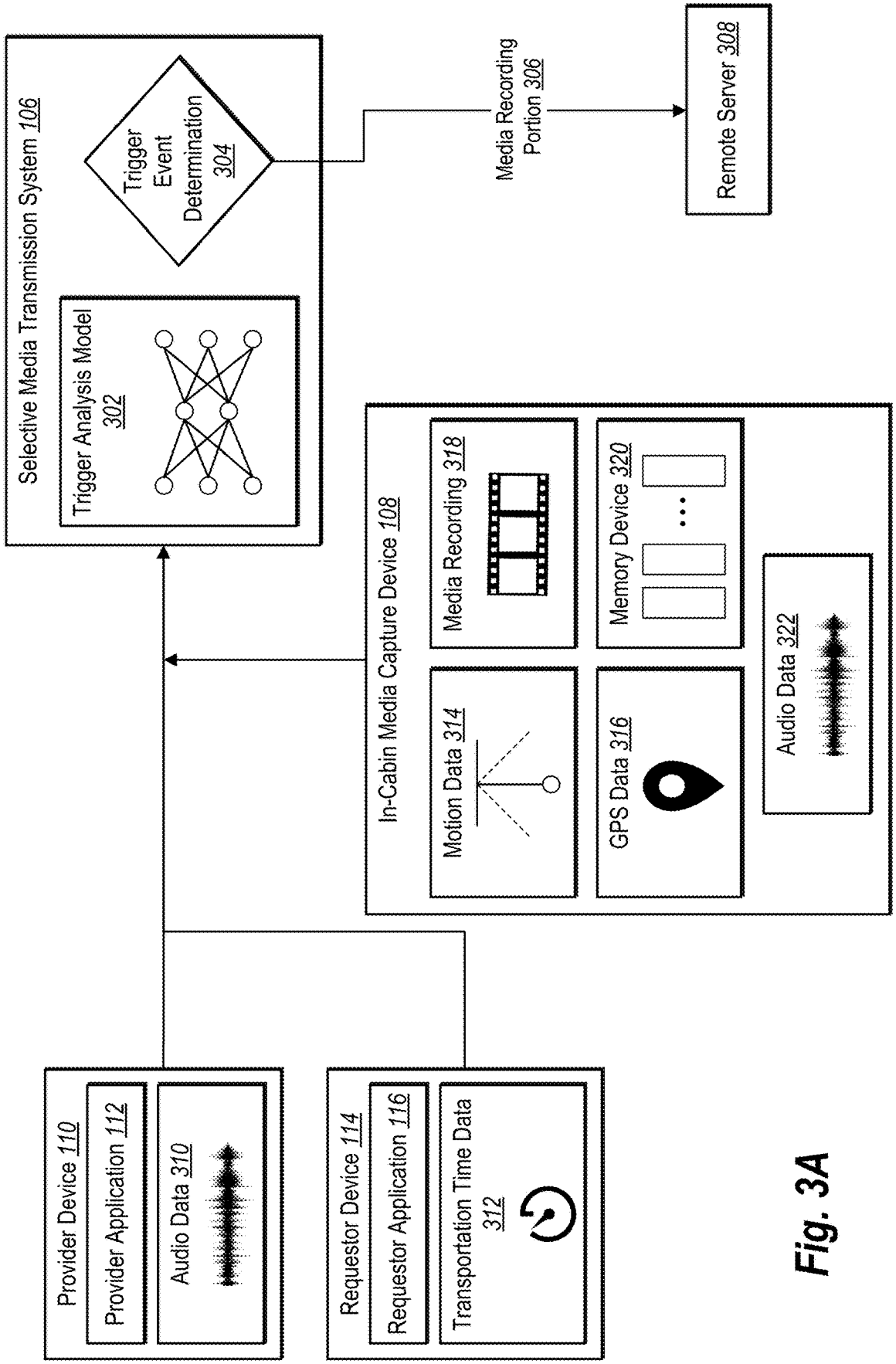
FIG. 3A illustrates a selective media transmission system utilizing a trigger analysis model in accordance with one or more embodiments.

As shown in FIG. 3A, the in-cabin media capture device 108, the provider device 110, and the requestor device 114 can each provide transportation service data to the selective media transmission system 106 (as mentioned above the selective media transmission system 106 can be implemented at a variety of computing devices, including the server(s) 102 and/or the in-cabin media capture device 108). In particular, FIG. 3A depicts an example configuration of the provider device 110 capturing audio data 310, the requestor device 114 capturing transportation time data 312, and the in-cabin media capture device 108 capturing motion data 314, GPS data 316, and audio data 322. Accordingly, as the transportation service progresses, the selective media transmission system 106 can instruct the provider device 110, the requestor device 114, and the in-cabin media capture device 108 to provide real-time updates of the transportation service data to the selective media transmission system 106. For example, throughout the transportation service, the provider device 110 can provide the audio data 310 to the selective media transmission system 106, the requestor device 114 can provide the transportation time data 312 to the selective media transmission system 106, and the in-cabin media capture device 108 can provide the motion data 314, the GPS data 316, and the audio data 322 to the selective media transmission system 106.

Similarly, throughout the transportation service, the in-cabin media capture device 108 can generate a media recording 318 comprising recorded events as they transpire during the transportation service. Moreover, the in-cabin media capture device 108 can provide real-time updates of the media recording 318 to the selective media transmission system 106 as the transportation service progresses. In addition, the in-cabin media capture device 108 can store the media recording 318 in a memory device 320, for example, as instructed by the selective media transmission system 106 (e.g., as described in more detail below in relation to FIG. 4).

As further shown in FIG. 3A, the selective media transmission system 106 utilizes the trigger analysis model 302 to analyze the transportation service data and/or the media recording 318 to identify a trigger event at a trigger event determination 304. In some embodiments, the trigger analysis model 302 can include heuristic algorithms or other rule-based decision models that utilize thresholds predetermined as associated with trigger events. For example, in applying the trigger analysis model 302 to the audio data 310 and/or the audio data 322, the selective media transmission system 106 can identify a confrontation event at the trigger event determination 304. To do so, the trigger analysis model 302 may compare a decibel level of the audio data 310 and/or the audio data 322 to a decibel threshold associated with or otherwise indicative of a person yelling. Similarly for instance, the trigger analysis model 302 may include a speech-to-text model that analyzes the audio data 310 and/or the audio data 322. In this manner, the selective media transmission system 106 can identify the presence of various groups of speech or trigger phrases during the transportation service, for example, profane language, hate speech, sexually-oriented speech, discriminatory or derogatory terms, etc. that are associated with or otherwise indicative of confrontation.

As another example, in applying the trigger analysis model 302 to the transportation time data 312, the selective media transmission system 106 can identify a transportation irregularity at the trigger event determination 304. To do so, the trigger analysis model 302 may compare a current amount of time elapsed since the transportation service began per the transportation time data 312 with an anticipated transportation pattern comprising an expected travel duration. If the current amount of time elapsed exceeds the expected travel duration by a threshold time delay associated with or otherwise indicative of a technical error (e.g., bad network connection), a user input omission (e.g., not indicating arrival at drop-off location), or potential wrongful conduct, the trigger analysis model 302 can deem the transportation time data 312 as indicative of a transportation irregularity.

Likewise, in applying the trigger analysis model 302 to the GPS data 316, the selective media transmission system 106 can identify a transportation irregularity at the trigger event determination 304. To do so, the selective media transmission system 106 may compare an actual travel route per the GPS data 316 to an anticipated transportation pattern comprising a navigationally-instructed travel route. If a deviation of an actual travel route in comparison to the navigationally-instructed travel route satisfies a threshold deviation, the trigger analysis model 302 can deem the GPS data 316 as indicative of a transportation irregularity. In these or other embodiments, a threshold deviation may include, for example, a threshold street deviation, threshold city-block deviation, threshold distance deviation, threshold directional bearing deviation, unscheduled stop, missed pickup/drop-off location, etc.

Additionally or alternatively, in some embodiments, the selective media transmission system 106 may apply the trigger analysis model 302 to both the transportation time data 312 and the GPS data 316 in combination and/or throughout a transportation service. For example, in some implementations, the trigger analysis model 302 may determine one or more expected progress markers or checkpoint locations associated with a geographic area where the dynamic transportation matching system 104 estimates the position of the in-cabin media capture device 108 should be positioned at a certain time. If a real-time location of the in-cabin media capture device 108 (or the provider device 110 or the requestor device 114) fails to satisfy such a checkpoint location within a threshold time (or a threshold number of checkpoint locations), the trigger analysis model 302 can deem the transportation time data 312 and/or the GPS data 316 as indicative of a transportation irregularity.

As yet another example, in applying the trigger analysis model 302 to the motion data 314, the selective media transmission system 106 can identify a collision event or a reckless driving event at the trigger event determination 304. To do so, the selective media transmission system 106 may compare the motion data 314 to a collision motion threshold or pattern (e.g., motion data indicative of actual collisions or crashes). Similarly, the selective media transmission system 106 can compare the motion data to a reckless driving motion threshold or pattern (e.g., motion data indicative of swerving, locked brakes, lane departures, speeding, etc.). In some embodiments, this comparison may include a relationship to localized traffic configuration data, localized traffic law data, and the like. Moreover, if the motion data 314 satisfies a threshold proximity or threshold similarity to a collision motion pattern and/or reckless motion pattern, the trigger analysis model 302 can identify a collision event or a reckless driving event. As an example, the trigger analysis model 302 may compare head-on collision data with the motion data 314 comprising an unusually rapid deceleration of the in-cabin media capture device 108 to a sudden stop, and determine the motion data 314 satisfies a threshold indicative of a collision event.

Additionally or alternatively, in some embodiments, the trigger analysis model 302 comprises one or more machine-learning models, and the selective media transmission system 106 can identify the foregoing trigger events, among others, based on transportation service data according to the one or more machine-learning models. For example, the trigger analysis model 302 can utilize multiple machine-learning models each trained to generate a prediction regarding a trigger event. For example trigger analysis model 302 can utilize an audio trigger machine-learning model, a time-position trigger machine-learning model, a motion trigger machine-learning model, etc. Alternatively, in some embodiments, the one or more machine-learning models comprises a single machine-learning model and/or a combination model of the foregoing machine-learning models that is trained to generate one or more trigger event predictions.

To illustrate, in some embodiments, the selective media transmission system 106 can identify audio-based trigger events at the trigger event determination 304 by applying an audio trigger machine-learning model to the audio data 310 and/or the audio data 322. For example, utilizing the audio trigger machine-learning model (such as a convolutional neural network), the selective media transmission system 106 can analyze the audio data 310 and/or the audio data 322. From the analysis, the selective media transmission system 106 can generate a confrontation event prediction (or other trigger event prediction) based on audio patterns identified in the audio data 310 and/or the audio data 322. Specifically, for instance, the audio trigger machine-learning model may analyze the audio data 310 and/or the audio data 322 to identify a decibel pattern, an amplitude pattern, a tonal pattern, etc. and generate a corresponding confrontation event prediction. In addition, generating the confrontation event prediction can include the audio trigger machine-learning model determining whether the confrontation event prediction satisfies one or more probability thresholds indicating at least one of a likelihood of a confrontation event or a severity of a confrontation event. For instance, if the confrontation event prediction satisfies a confrontation event probability threshold, the selective media transmission system 106 may proceed to transmit a media recording portion 306 to the remote server 308. If not, the selective media transmission system 106 may determine, at the trigger event determination 304, that the confrontation trigger event prediction fails to trigger transmitting the media recording portion 306 to the remote server 308.

Similarly, in some embodiments, the selective media transmission system 106 can identify trigger events at the trigger event determination 304 by applying a time-position trigger machine-learning model to at least one of the transportation time data 312 or the GPS data 316. In doing so, the time-position trigger machine-learning model can identify a route deviation pattern, a driver-error pattern, a traffic pattern, etc. and generate a corresponding transportation irregularity prediction. In addition, generating the transportation irregularity prediction can include the time-position trigger machine-learning model determining whether the transportation irregularity prediction satisfies one or more probability thresholds indicating a likelihood of a transportation irregularity. Additionally or alternatively, such probability thresholds may indicate a likelihood of a specific event causing the transportation irregularity (e.g., a driver forgetting to 'end' the transportation service). Further, and as similarly mentioned above, if the transportation irregularity prediction satisfies a transportation irregularity probability threshold, the selective media transmission system 106 may proceed to transmit the media recording portion 306 to the remote server 308.

As another example, in some embodiments, the selective media transmission system 106 can identify trigger events at the trigger event determination 304 by applying a motion trigger machine-learning model to the motion data 314. In doing so, the motion trigger machine-learning model can identify a velocity pattern, an acceleration/deceleration pattern, an inertial pattern, a driving behavior pattern, etc. and generate a corresponding collision event prediction. In addition, generating the collision event prediction can include the motion trigger machine-learning model determining whether the collision event prediction satisfies one or more probability thresholds indicating a likelihood of a collision event. Further, and as similarly mentioned in the foregoing examples, if the collision event prediction satisfies a collision event probability threshold, the selective media transmission system 106 may proceed to transmit the media recording portion 306 to the remote server 308.

Additionally or alternatively to the transportation service data, in some embodiments, the selective media transmission system 106 can identify trigger events at the trigger event determination 304 by applying a machine-learning model to the media recording 318. For example, a machine-learning model may include a visual-cue machine-learning model trained to identify visual cues captured in the media recording 318 that correspond to a particular trigger event. Visual cues may include, for instance, visual data depicting certain types of body language and/or one or more overt actions during the transportation service to: open/close a vehicle door, enter/exit the vehicle, cover (or attempt to cover) a camera of the in-cabin media capture device 108, reach forward towards a provider positioned in a front portion of the vehicle, reach backward towards a requestor positioned in a back portion of the vehicle, initiate physical contact between one or more individuals, provide an obscene gesture, indicate extreme emotion, etc.

To train a machine-learning model to identify a trigger event, the selective media transmission system 106 can analyze input data utilizing the machine learning model to generate a trigger event prediction. The selective media transmission system 106 can then compare the predicted trigger event with ground truth data (e.g., observed, ground truth labels for trigger events corresponding to the input data) to determine a loss using a loss function. In these or other embodiments, the loss function can include, but is not limited to, a regression loss function (e.g., a mean square error function, a quadratic loss function, an L2 loss function, a mean absolute error/L1 loss function, mean bias error). Additionally, or alternatively, the loss function can include a classification loss function (e.g., a hinge loss/multi-class SVM loss function, cross entropy loss/negative log likelihood function). Further, the loss function can return quantifiable data (e.g., probability values, confidence scores, etc.) regarding the difference between the predicted trigger event and ground truth data. Based on this determined loss, the selective media transmission system 106 can adjust various parameters to improve the quality/accuracy of a predicted trigger event in subsequent training iterations—by narrowing the difference (e.g., increasing a probability value) between the predicted trigger event and ground truth data. For example, the selective media transmission system 106 can utilize back-propagation techniques to modify parameters of a neural network based on a measure of loss resulting from a loss function.

Based on the trigger analysis model 302 identifying one or more trigger events at the trigger event determination 304 as just discussed, the selective media transmission system 106 can determine a media recording portion 306 that is a relevant portion of the media recording 318 corresponding to the trigger event. For example, in a same or similar manner as described above in relation to FIG. 2 or as described more below in relation to FIG. 4, the selective media transmission system 106 can apply a media duration to a timestamp of the trigger event determined at the trigger event determination 304. In these or other embodiments, the media recording portion 306 comprises a subset of the media recording 318, for example, to reduce network bandwidth consumption and increase transmission speeds for uploading. In turn, the selective media transmission system 106 can upload the media recording portion 306 to the remote server 308 for performing one or more review processes described below in relation to FIG. 5.

Although FIG. 3 illustrates a particular set of computing devices collecting a particular set of transportation service data, the selective media transmission system can access and analyze a variety of configurations of transportation service data from a variety of computing devices. For example, the in-cabin media capture device 108, the provider device 110, and the requestor device 114 can each generate additional or alternative transportation service data (or in some implementations, no transportation service data). For example, in some embodiments, the in-cabin media capture device 108 is the only computing device that captures transportation service data. In other embodiments, the provider device 110 and the requestor device 114 capture and transmit transportation service data.

Similarly, in some embodiments at least one of the in-cabin media capture device 108, the provider device 110, or the requestor device 114 may generate one or more types of transportation service data, but not necessarily communicate the transportation service data to the selective media transmission system 106 (e.g., at the instruction of the selective media transmission system 106 to conserve network bandwidth or increase transportation speeds of other transportation service data). For example, the in-cabin media capture device 108 and at least one of the provider device 110 or the requestor device 114 may generate the GPS data 316, but only the in-cabin media capture device 108 may communicate the GPS data 316 to the selective media transmission system 106 to avoid unnecessary bandwidth consumption and/or subsequent processing.

Moreover, although FIG. 3 illustrates the selective media transmission system 106 as separate from the in-cabin media capture device 108, in some embodiments, the selective media transmission system 106 is implemented as part of the in-cabin media capture device 108. For example, the in-cabin media capture device 108 can collect and analyze transportation service data to identify trigger events. To illustrate, the in-cabin media capture device 108 can capture transportation service data and/or it can receive transportation service data from the provider device 110 and/or the requestor device 114 (e.g., via BlueTooth or via a server device). The in-cabin media capture device 108 can analyze the transportation service data and identify a trigger event. Indeed, in some embodiments, the in-cabin media capture device 108 captures a media recording, analyzes the media recording utilizing a machine learning model to identify trigger events, and then stores or transmits a portion of the media recording corresponding to the event.

In other embodiments, the selective media transmission system 106 is also implemented via the server(s) 102. For example, the in-cabin media capture device 108, the provider device 110, the requestor device 114, and/or a third-party device (not illustrated) can capture transportation service data and transmit the transportation service data to the server(s) 102. The server(s) 102 can apply a trigger analysis model to the transportation service data, identify a trigger event, and transmit an indication of the trigger event to the in-cabin media capture device (causing the in-cabin media capture device 108 to store and/or transmit a portion of the media recording).

Furthermore, although not illustrated, the selective media transmission system 106 can also apply one or more data privacy protocols to the media recording portion 306 prior to uploading to the remote server 308. For instance, in some embodiments, the selective media transmission system 106 at least partially blurs out faces, obscures visible personal information (e.g., nametags, security cards, device screens, etc.), among other suitable data privacy measures for de-identification, anonymization, or the like. As an example, prior to storage and/or transmission of the media recording, the in-cabin media capture device 108 can blur faces, nametags, voices, or other identifying features in a digital image or digital video. To do so, the selective media transmission system 106 in some implementations utilizes a machine-learning model trained to identify protectable features (e.g., human faces) of a digital image or a digital video and correspondingly apply privacy protection modifications. In some implementations, the selective media transmission system 106 can utilize a machine-learning model that applies an object detection algorithm to identify a subset of pixels and apply one or more corresponding modifications. To illustrate, the object detection algorithm may triangulate various facial features (a nose, mouth, eyes, forehead, etc.) and define a subset of modifiable pixels as positioned between or including one or more facial features. Once identified, the machine-learning model may apply modifications, for instance, that blend one or more pixels of the subset of pixels together to make the blended pixels, as a whole, depict incomprehensible or unidentifiable content. In other embodiments, the modifications may include, for example, removing pixels, changing pixel color values to a default color value (e.g., grey), or adding an obscuring layer/object on top of a digital image or digital video. The selective media transmission system 106 can apply these modifications at a variety of times (e.g., upon capturing the media recording, upon storing the media recording, prior to transferring the media recording, or after transferring the media recording) utilizing a variety of devices (e.g., utilizing the in-cabin media capture device a remote server or another device).

Additionally or alternatively to data privacy measures, in some implementations, the selective media transmission system 106 can implement one or more data redundancy measures as a security feature. For example, in some embodiments, the selective media transmission system 106 can compare transportation service data from one or more devices as just discussed. In some cases, the trigger analysis model 302 may indicate that an offset of the transportation service data between two or more devices is greater than or equal to a threshold offset. In response, the selective media transmission system 106 can determine a trigger event occurred.

As mentioned above, the selective media transmission system 106 can utilize transportation service data to identify a trigger event, including transportation service data from a provider device and/or a requestor device. In particular, in some embodiments, the selective media transmission system 106 identifies trigger events from digital incident reports corresponding to a transportation service. FIG. 3B illustrates a computing device 330 presenting user interfaces 332a-332b for providing a digital incident report in accordance with one or more embodiments. The computing device 330 may be the same as or similar to a provider device 110 and/or a requestor device 114 described above in relation to the foregoing figures.

As shown in FIG. 3B, the user interface 332a includes input elements for receiving user interaction via haptic input, textual input, or the like. In particular, the user interface 332a includes input element 333 for rating the transportation service, input elements 334a-334e for providing specific feedback regarding the transportation service, and input element 336 for submitting a digital incident report to the dynamic transportation matching system 104 or the selective media transmission system 106. Moreover, in response to a user interaction with one or more of the input elements of the user interface 332a, the computing device 330 can provide transportation service data to the selective media transmission system 106 (i.e., in the form of a digital incident report). Accordingly, in some embodiments, the selective media transmission system 106 may identify one or more discrete trigger events depending on a selected input element of the user interface 332a.

For example, in response to detecting a user interaction at input element 333, the computing device 330 can present the user interface 332a comprising a selected rating (e.g., four stars). Moreover, in some embodiments, upon the selective media transmission system 106 receiving the digital incident report comprising the selected rating in the input element 333, the selective media transmission system 106 may identify one or more corresponding trigger events, and/or in some cases weight the digital incident report based on the selected rating. For instance, the selective media transmission system 106 may associate a one-star rating as relatively urgent compared to a four star rating and therefore assign greater weight to a digital incident report comprising a one-star rating selected at the input element 333. Additionally or alternatively, in some embodiments, upon detecting a user interaction at input element 333, the computing device 330 can present one or more of the input elements 334a-334e.

Moreover, in some embodiments, upon the selective media transmission system 106 receiving the digital incident report comprising the selected input element 334a, the selective media transmission system 106 may identify one or more corresponding trigger events. For example, the selective media transmission system 106 may identify a "driver issue" as indicative of a confrontation event described above.

Similarly, in response to detecting a user interaction at input element 334b, the computing device 330 can transmit a digital incident report indicating a "car concern." Moreover, in some embodiments, upon the selective media transmission system 106 receiving the digital incident report comprising the selected input element 334b, the selective media transmission system 106 may identify one or more corresponding trigger events. For example, the selective media transmission system 106 may identify a "car concern" as indicative of a trigger event comprising a vehicle issue. Similarly, the selective media transmission system 106 can identify trigger events based on user selection of "route trouble," "payment problem," or other elements.

In addition, in response to detecting a user interaction at input element 334e, the computing device 330 can present a user interface comprising text or other alphanumeric input at the input element 334e for "add a comment." Moreover, in some embodiments, upon the selective media transmission system 106 receiving the digital incident report comprising text or other alphanumeric input at the input element 334e, the selective media transmission system 106 may identify one or more corresponding trigger events, weight a trigger event, etc. For example, the selective media transmission system 106 may analyze the provided text in the input element 334e to weight a trigger event corresponding to another user selection (e.g., to weight the transportation irregularity corresponding to the user selection of the input element 334c).

As shown, the user interface 332a includes an input element 336 (i.e., "Send to Lyft"). Based on user interaction with the input element 336, the selective media transmission system 106 can analyze the digital incident report and identify a trigger event. For example, in response to detecting a user interaction with the input element 336, the computing device 330 may provide the digital incident report to the selective media transmission system 106, whereupon receipt the selective media transmission system 106 can provide the digital incident report to the trigger analysis model 302 to identify a trigger event. In turn, the selective media transmission system 106 can determine a media recording portion for storing at an in-cabin media capture device or for uploading to a remote server.

In addition, the selective media transmission system 106 can provide a user interface with a selectable option for requesting a media recording. As shown in FIG. 3B, the user interface 332b includes an input element 334f to "request [a] media recording." In some embodiments, upon the selective media transmission system 106 receiving a digital incident report comprising an indication of the selected input element 334f, the selective media transmission system 106 may identify a trigger event. Moreover, the selective media transmission system 106 can store and/or transmit a portion of a media recording to a remote server. Once the media recording portion is at the remote server, the remote server can determine (as described more below in relation to FIG. 5) how to respond to the media recording request initiated in response to a user selection of the input element 334f.

Additionally or alternatively to identifying a user selection of input element 334f, in some embodiments the selective media transmission system 106 may predict whether the computing device 300 will initiate a media recording request. For instance, using a machine-learning model trained to predict such a media recording request, the selective media transmission system 106 can analyze transportation service data (as described above) and/or a user history of media recording requests to generate a media recording request prediction. If the media recording request prediction satisfies a threshold prediction probability, the selective media transmission system 106 may store, transmit, and/or request a media recording portion. In some cases, the selective media transmission system 106 may do so prior to or without selection of input element 334f.

In these or other embodiments, the user interfaces 332a-332b may include a different arrangement of input elements than that shown in FIG. 3B. For example, a user interface of the computing device 330 may comprise additional or alternative input elements and/or the input elements may correspond to additional or alternative trigger events according to the selective media transmission system 106.

Moreover, although FIG. 3B illustrates user interfaces 332a-332b as corresponding to the computing device 330 (e.g., a requestor device), other embodiments may include similar user interfaces corresponding to the computing device 330 (e.g., a provider device or a third-party device). In these or other embodiments, the user interfaces of the provider device may include the same, similar, or alternative input elements as illustrated in the user interfaces 332a-332b. For example, a user interface corresponding to a provider device may include an input element for a "Rider Issue" instead of the "Driver Issue" shown for the input element 334a. In response to an indication of a user selection of an input element for a "Rider Issue," the selective media transmission system 106 may likewise identify a "Rider issue" as indicative of a confrontation event described above. In another example where the computing device 330 corresponds to a third-party device (e.g., a pedestrian device, another provider/requestor device associated with a different transportation service, etc.), the user interfaces 332a-332b can be modified accordingly, For example, the user interfaces 332a-332b can be modified such that the third-party device can provide information regarding some event that the third-party witnessed, deescalated, etc. in relation to the transportation service.

Figure 4:
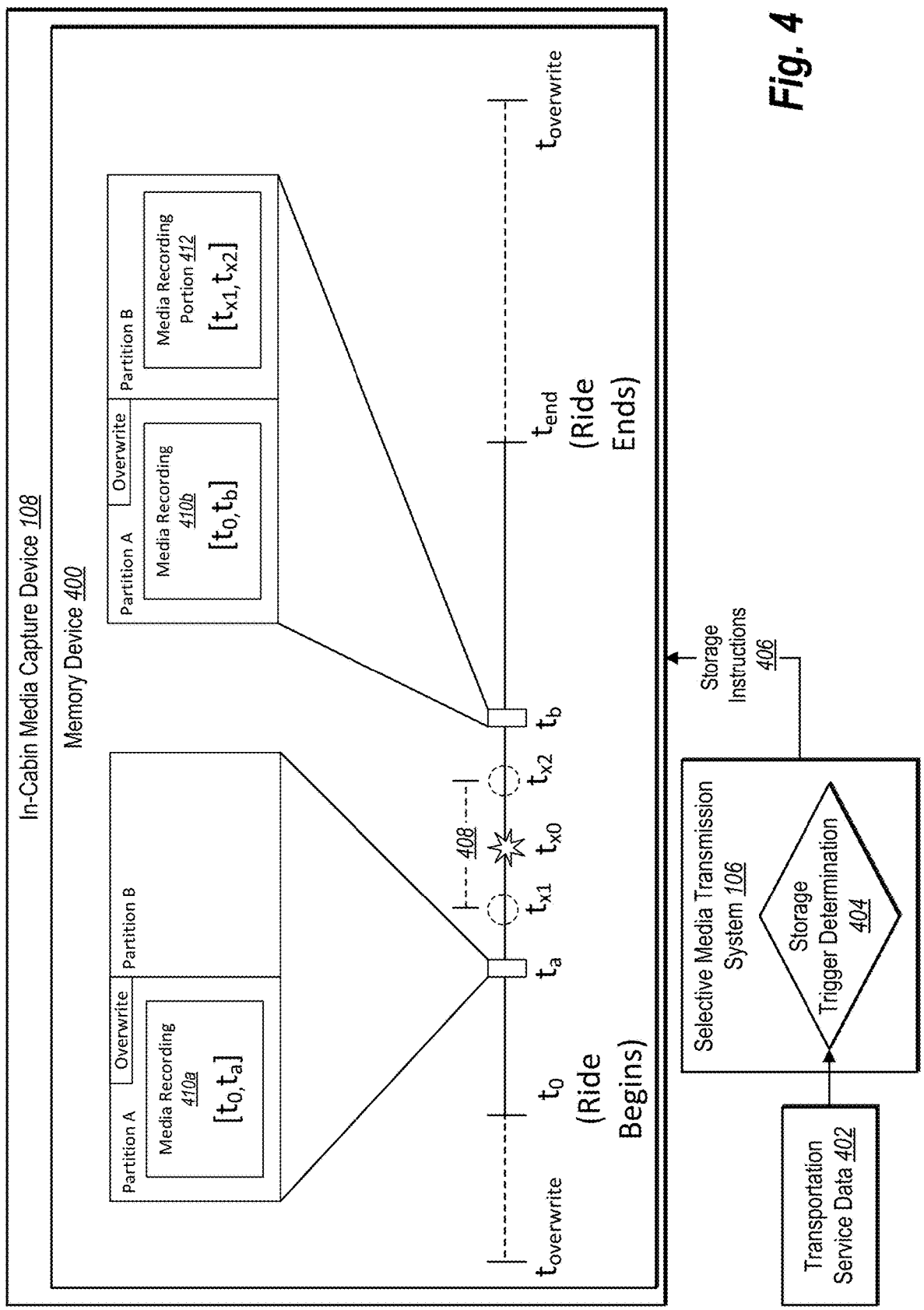
FIG. 4 illustrates a selective media transmission system identifying a storage trigger event and providing corresponding storage instructions for storing a media recording portion at an in-cabin media capture device in accordance with one or more embodiments.

As mentioned above, an in-cabin media capture device can, at the instruction of the selective media transmission system 106, store a media recording, including media recording portions corresponding to a trigger event in specific memory partitions of a memory device. FIG. 4 illustrates the selective media transmission system 106 identifying a storage trigger event and providing corresponding storage instructions 406 for storing a media recording portion 412 at the in-cabin media capture device 108 in accordance with one or more embodiments. As shown, the in-cabin media capture device 108 comprises a memory device 400. In particular, the memory device 400 operates to store media recordings of transportation services at the instruction of the selective media transmission system 106. As shown in FIG. 4, the selective media transmission system 106 continuously overwrites one or more memory partitions (e.g., Partition A) based on an overwrite looping duration. Specifically, the selective media transmission system 106 overwrites the memory partition based on an overwrite looping duration spanning between $t_{overwrite}$ and $t_{overwrite}$ In some embodiments, the predetermined overwrite looping duration lasts several hours, while in other embodiments, multiple days or weeks as configurable according to the selective media transmission system 106.

In some embodiments, the selective media transmission system 106 determines the overwrite looping duration. For example, the selective media transmission system 106 can determine the overwrite looping duration based on the memory resources of the in-cabin media capture device (e.g., larger memory resources correspond to a longer duration). In some embodiments, the selective media transmission system 106 determines the overwrite looping duration based on a provider driver history. For example, the selective media transmission system 106 can select the overwrite looping duration based on driving frequency of a provider or provider device. To illustrate, the selective media transmission system can select a larger overwrite looping duration for a provider device that provides transportation services 8 hours per day than for a provider device that provides transportation services 1 hour per day.

As further shown, the selective media transmission system 106 can identify a storage trigger event at the storage trigger determination 404 based on transportation service data 402 (e.g., as described above in relation to the trigger event determination 304 and various transportation service data of FIG. 3A). If the selective media transmission system 106 identifies no storage trigger event at the storage trigger determination 404, the selective media transmission system 106 can provide the corresponding storage instructions 406 to the in-cabin media capture device 108. In the case where no storage trigger is identified, the storage instructions 406 can include default instructions for the in-cabin media capture device 108 to store a media recording in a first memory partition set to overwrite after a predetermined overwrite looping duration. Additionally or alternatively, such default instructions can be preset on the in-cabin media capture device 108 (e.g., to save a media recording in Partition A). For example, as shown at time ta, the memory device 400 comprises data storage in Partition A (set to overwrite) including a media recording 410*a* with content from to (when the transportation service begins) through ta.

On the other hand, in response to identifying a storage trigger event at the storage trigger determination 404, the selective media transmission system 106 can determine a specific media recording portion to call out in the storage instructions 406 for storing in a second memory partition (e.g., Partition B not set to overwrite). To do so, for example, the selective media transmission system 106 can identify a timestamp for the transportation service data 402 at which the selective media transmission system 106 identifies a storage trigger event (e.g., at time $t_{tsd\_trigger}$) In turn, the selective media transmission system 106 can identify a timestamp $t_{x0}$ in the media recording that corresponds to the timestamp $t_{tsd\_trigger}$ for the transportation service data 402. For example, by applying the timestamp $t_{tsd\_trigger}$ for the transportation service data 402 to the media recording, the selective media transmission system 106 can match the transportation service data 402 to the media recording. In some embodiments, the transportation service data 402 may be temporally synchronized with the media recording. In other embodiments, the selective media transmission system 106 may need to determine the temporal relationship between the transportation service data 402 and the media recording in order to determine the timestamp $t_{x0}$ in the media recording that corresponds to the timestamp $t_{tsd\_trigger}$ for the transportation service data 402.

After determining the timestamp $t_{x0}$ in the media recording, the selective media transmission system 106 can determine the media recording portion 412 for storing in Partition B by applying a media duration 408 to the timestamp $t_{x0}$ in the media recording. To determine the media duration 408, the selective media transmission system 106 can identify a media duration that corresponds to the identified trigger event (e.g., a media duration specific to an upload trigger event or a storage trigger event). For example, a confrontation event may correspond to a first media duration, and a collision event may correspond to a second media duration. Additionally or alternatively, the selective media transmission system 106 may determine the media duration 408 by utilizing a default media duration configurable according to parameters of the selective media transmission system 106.

Further, in some embodiments, the selective media transmission system 106 may determine the media duration 408 by analyzing the transportation service data 402 to determine what timestamps $t_{x1}$ and $t_{x2}$ provide sufficient context for the trigger event. For example, given a collision event at $t_{x0}$, five minutes prior to the collision event in many situations would be unnecessary where the transportation service data 402 comprises normal motion data until three seconds before the collision event. However, in the event that the transportation service data 402 comprises erratic motion data several minutes before the collision event at $t_{x0}$, the selective media transmission system 106 may extend the media duration to capture, in the media recording portion, the beginning of the erratic motion data. Thus, in some embodiments, the selective media transmission system 106 can determine the media duration 408 by analyzing changes (e.g., differential thresholds) in the transportation service data 402 before and/or after the collision event at $t_{x0}$.

Based on such application of the media duration 408 to the timestamp $t_{x0}$, the selective media transmission system 106 can identify the media recording portion 412 as defined between times $t_{x1}$ and $t_{x2}$ in the media recording. In turn, the selective media transmission system 106 can provide the corresponding storage instructions 406 to the in-cabin media capture device 108. For example, the storage instructions 406 can include instructions for the in-cabin media capture device 108 to store the media recording portion 412 in Partition B.

The selective media transmission system 106 can store the media recording portion 412 in Partition B permanently (e.g., without instructions to delete at a particular time) or for some period of time (e.g., a longer period of time than the overwrite looping duration associated with Partition A). For example, as shown at time $t_b$, the memory device 400 comprises data storage in Partition B including the media recording portion 412 with content from $t_{x1}$ through $t_{x2}$. As also shown at time $t_b$, for example, the memory device 400 comprises data storage in Partition A including a media recording 410*b* with content from to through $t_b$.

In addition, after storing the media recording portion 412 in Partition B, the selective media transmission system 106 can upload the media recording portion 412 to a remote server as described in relation to the foregoing figures (e.g., in response to identifying an upload trigger event). In some embodiments, where the storage trigger event and the upload trigger event are the same, the selective media transmission system 106 may automatically initiate an upload of the media recording portion 412 from Partition B of the memory device 400 to a remote server. In these or other embodiments, such an upload to a remote server may be in real-time (or near real-time), for example, on a rolling-basis as the memory device 400 is saving the media recording portion to Partition B up through a current read/write time of the media recording to the memory device 400. Alternatively, such an upload to a remote server may include a batch upload (e.g., that remains pending until the media duration 408 is complete at time $t_{x2}$ such that the selective media transmission system 106 can execute a single, combined upload of the media recording portion 412).

Figure 5:
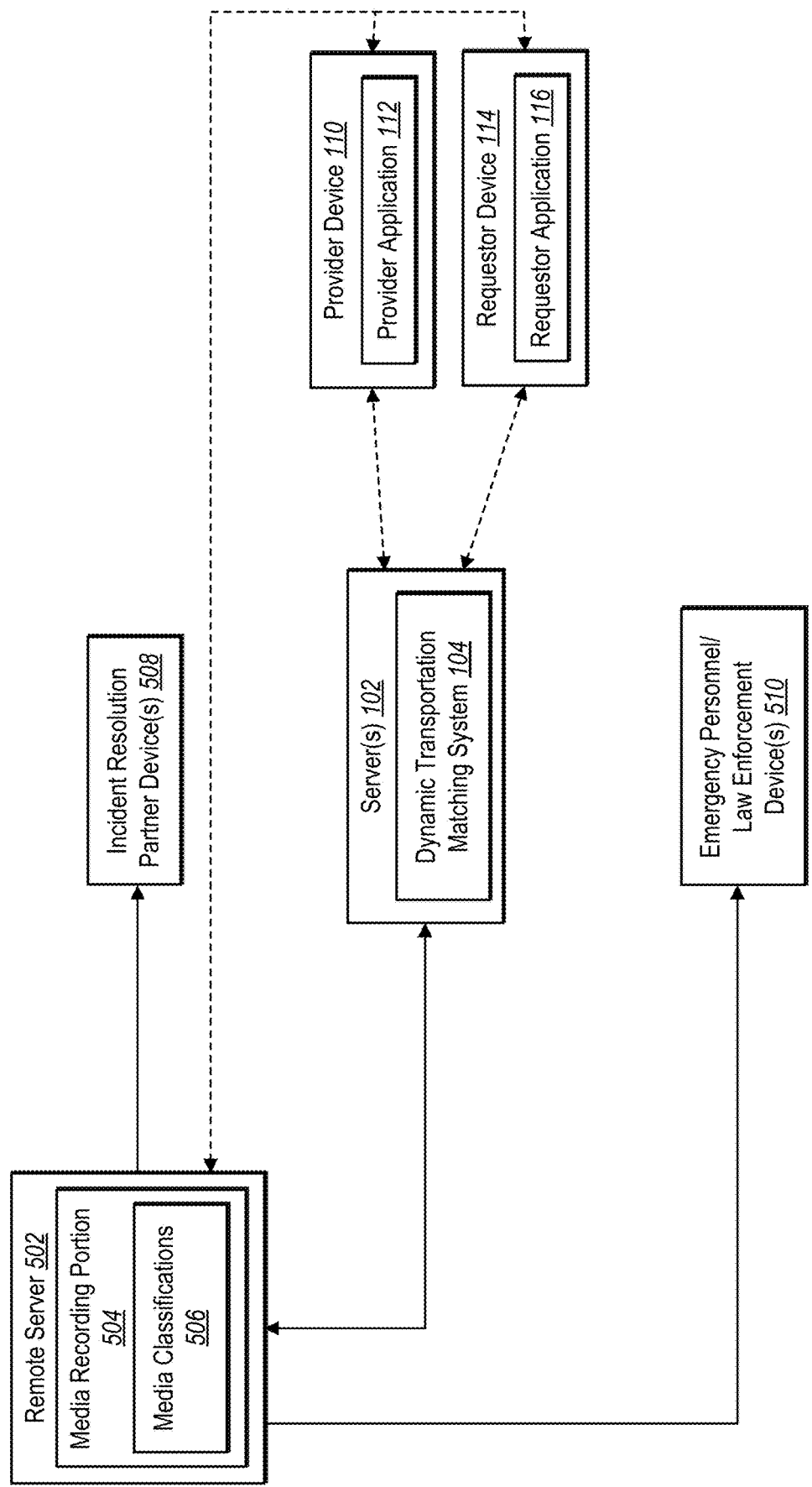
FIG. 5 illustrates a remote server performing acts to review a media recording portion and provide communications related thereto in accordance with one or more embodiments.

As mentioned above, the selective media transmission system 106 can upload a media recording portion to a remote server for performing an objective review of the media recording portion. FIG. 5 illustrates a remote server 502 performing acts to review a media recording portion 504 and provide communications related thereto in accordance with one or more embodiments. As shown, the remote server 502 comprises the media recording portion 504 uploaded from the selective media transmission system 106 in response to identifying a trigger event as described in relation to the foregoing figures.

As shown, the media recording portion 504 includes media classifications 506. The selective media transmission system 106 or the remote server 502 can generate the media classifications 506. Moreover, the media classifications 506 can reflect the contents or classes of a particular media recording. For example, the selective media transmission system 106 can generate the media classifications 506 to prioritize uploading of particular media recordings or the remote server 502 can generate the media classifications 506 to prioritize analysis of particular media recordings and/or to determine whether additional action is necessary with regard to each media recording. In these or other embodiments, the media classifications 506 can include metadata, tags, or other suitable classification data descriptive of the media recording portion 504. Examples of media classifications 506 may include, for instance, a type of trigger event (e.g., fraud, accident, belligerent conduct, provider device request, requestor device request, etc.), a severity class (e.g., fenderbender versus life-threatening accident), or a notification class (e.g., a criminal class for law enforcement or a customer complaint class for the transportation matching system).

To generate the media classifications 506, the selective media transmission system 106 can extract data tags from the transportation service data that is used to identify the trigger event and corresponding media recording portion 504. For example, the transportation service data may include data tags from row/column headers, measurement units, flagged outlier data, etc.

Additionally or alternatively, the selective media transmission system 106 can utilize a machine-learning model trained to generate media classification predictions based on the identified trigger event, the transportation service data, the media recording, and/or entities requesting the media recording portion 504. In these or other embodiments, such a machine-learning model generating media classification predictions may be the same as or similar to the machine-learning models discussed above in relation to FIG. 3A. For example, a motion trigger machine-learning model may analyze motion data as described above and generate media classification predictions for specific timestamps of the motion data. In turn, the selective media transmission system 106 can apply one or more media classifications 506 to the media recording portion 504 at corresponding timestamps based on the media classification predictions from the machine-learning model. Thus, utilizing the media classifications 506, the selective media transmission system 106 can intelligently inform the remote server 502 that the media recording portion 504 may visually indicate certain events or content at corresponding timestamps of the media recording portion 504.

In like manner, the selective media transmission system 106 can utilize a machine-learning model to predict a severity of the trigger event and generate a corresponding media classification prediction. For example, a motion trigger machine-learning model may analyze motion data as described above and generate media classification predictions describing a predicted severity of a collision event (e.g., mild impact, moderate impact, harsh impact, critical impact, etc.). Based on the media classification predictions from a machine-learning model, the selective media transmission system 106 can apply the media classifications 506 to the media recording portion 504.

Using the media classifications 506 generated as just described, the selective media transmission system 106 can make a variety of determinations. For example, according to the media classifications 506, the selective media transmission system 106 may upload media recordings in a certain sequence or priority (e.g., according to a severity of the media classification). For instance, the selective media transmission system 106 may upload to the remote server 502 a media recording portion associated with a media classification of a harsh impact for a collision event faster (or prior to) uploading a media recording portion associated with a media classification of a three-star requestor rating.

Similarly, the remote server 502 may review the media recording portion 504 based on the media classifications 506. For instance, using the same example just provided, the remote server 502 may review a media recording portion associated with a media classification of a harsh impact for a collision event faster (or prior to) reviewing a media recording portion associated with a media classification of a three-star requestor rating. Further, in some embodiments, the remote server 502 can review the media classifications 506 in addition to or alternatively to the media recording portion 504. For example, in the event that uploading the media recording portion 504 is not permitted given certain circumstances (e.g., insufficient cellular service), the selective media transmission system 106 can upload the media classifications 506 to the remote server 502 for review.

In addition, the media classifications 506 can determine one or more review processes of the media recording portion 504 and/or the media classifications 506. For example, where the media classifications 506 comprises an indication of an accident, the remote server 502 can perform a review process specific to accidents and/or according to a severity of an accident. In turn, the remote server 502 can provide the media recording portion 504 to one or more third-party devices comprising incident resolution partner device(s) 508. Utilizing the media recording portion 504, the incident resolution partner device(s) 508 can more easily identify causation among other items.

Similarly, for instance, where the media classifications 506 comprises an indication of verbal harassment (e.g., a violation of a terms of service document), the remote server 502 can perform a harassment review process specific to verbal harassment and/or according to a severity of the harassment. In turn, the remote server 502 can provide the media recording portion 504 to the server(s) 102 for further assessment. Additionally or alternatively, consistent with privacy settings and applicable regulations, the server(s) 102 may pull or request the media recording portion 504 from the remote server 502. In some embodiments, the server(s) 102 and/or the remote server 502 may provide a digital request and/or notification to at least one of the provider device 110 or the requestor device 114 prior to transferring the media recording portion 504.

As an additional example, where the media classifications 506 comprises an indication of illegal activity, personal injury, etc., the remote server 502 can perform a review process specific to the illegal activity, personal injury, etc. In turn the remote server 502 can provide the media recording portion 504 to one or more third-party devices comprising emergency personnel/law enforcement device(s) 510 for improved response time, investigation, etc.

Additionally or alternatively to using the media classifications 506, the remote server 502 can utilize one or more machine-learning models to perform various review processing of the media recording portion 504. For example, in some embodiments, the remote server 502 can utilize a machine-learning model trained to predict points of interest within the media recording portion 504 and correspondingly generate a highlight clip. With the highlight clip of the media recording portion 504, the remote server 502 can expedite a review process thereof by reducing the amount of reviewable content. In this manner, the remote server 502 or other reviewing device can review the highlight clip of the media recording portion 504 while foregoing the need to process user interactions for scrubbing through portions of the media recording portion 504.

To generate these predicted points of interest for the predicted highlight clip, the remote server 502 can utilize a machine-learning model trained to identify the media classifications 506 at certain timestamps of the media recording portion 504. Additionally or alternatively, the predicted points of interest may include visual or audio details of the media recording portion 504 that the machine-learning model can identify as potentially unique or different from other portions of the media recording portion 504. Thus, in some embodiments, the remote server may utilize a machine-learning model that utilizes an object detection algorithm and an object recognition algorithm to respectively identify a subset of pixels and then identify the content for the subset of pixels. Accordingly, if the predicted points of interest as generated by the machine-learning model satisfy a point of interest probability threshold, the remote server 502 may add content to the highlight clip from the media recording portion 504 that corresponds to the predicted points of interest.

Figure 6A:
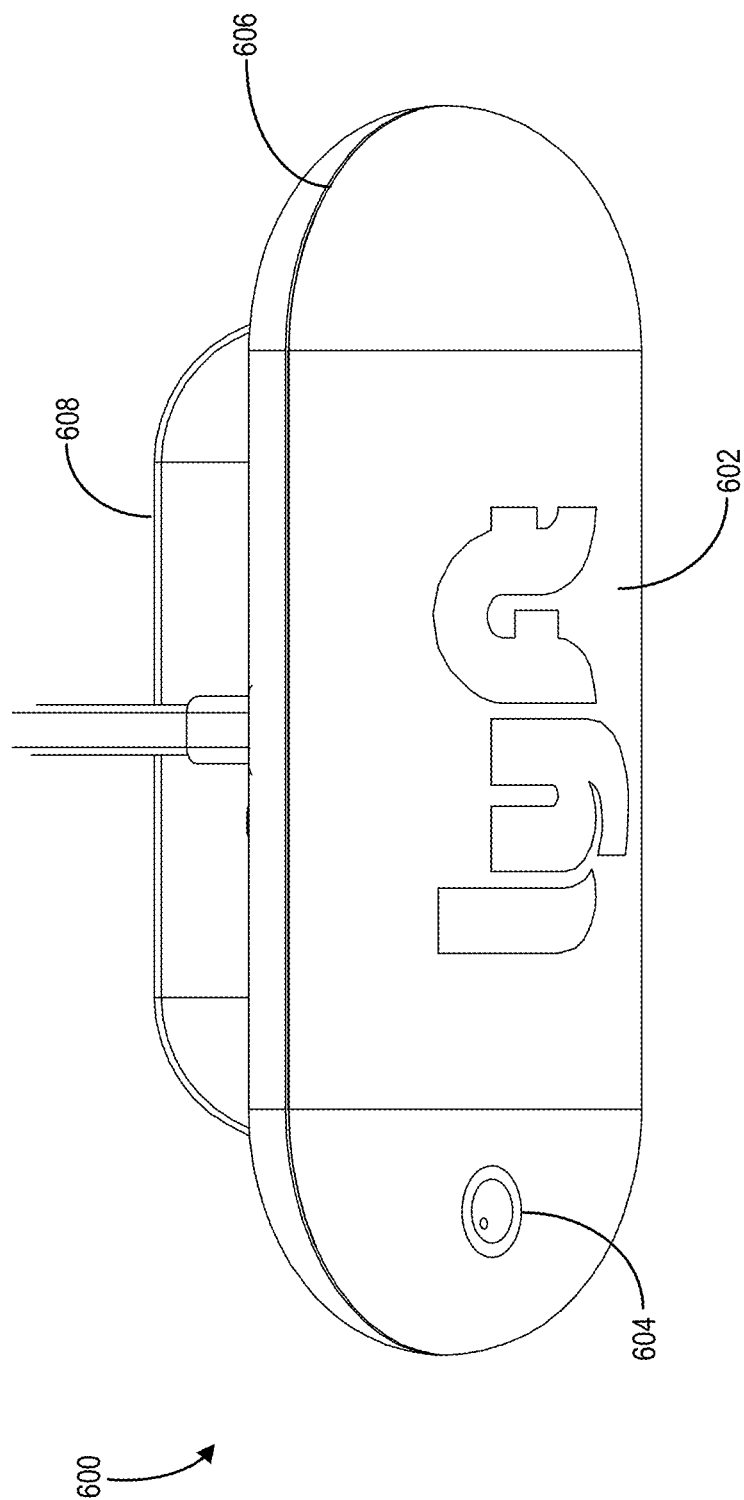
FIGS. 6A-6B respectively illustrate a top view and a rear perspective view of an in-cabin computing device in accordance with one or more embodiments.
Figure 6B:
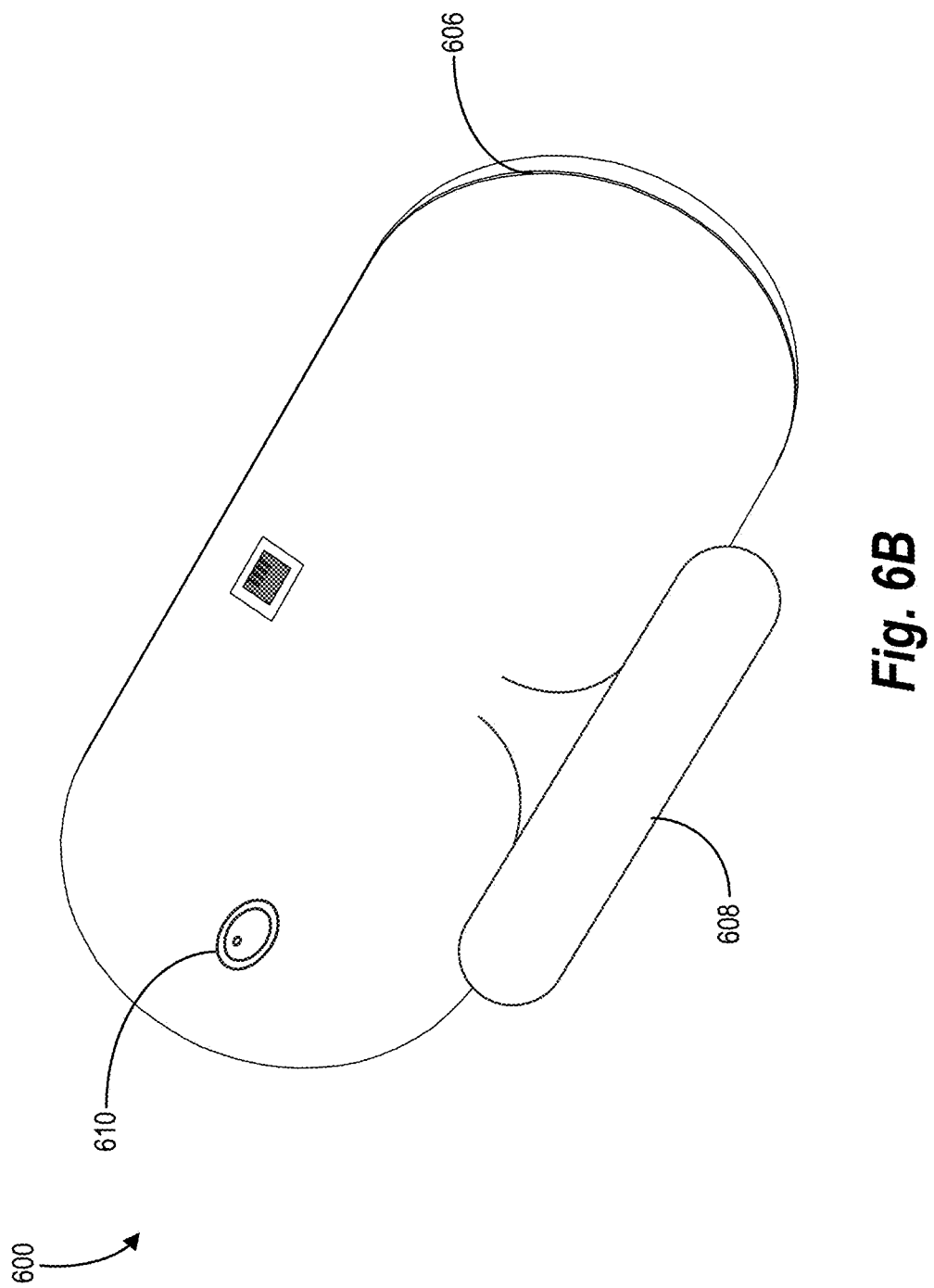

As mentioned above, the selective media transmission system 106 can utilize an in-cabin media capture device to generate a media recording of a transportation service. FIGS. 6A-6B respectively illustrate a top view and a rear perspective view of an in-cabin media capture device 600 in accordance with one or more embodiments. As shown in FIG. 6A, the in-cabin media capture device 600 comprises a display face 602, an external-facing camera 604, a light halo 606, and a mounting base 608.

The display face 602 can include one or more display features, including a configurable lumen output adjustable according to an ambient environment. Additionally, in some embodiments, the display face 602 indicates a personalized beaconing for pickup/drop-off. For instance, at pickup, the in-cabin media capture device 600 can cause the display face 602 to match a preferred display according to a provider device or a requestor device (e.g., based on custom settings). In an example embodiment, the in-cabin media capture device 600 can cause the display face 602 to present, for example: alphanumeric text (e.g., numbers, codes, pins, names, nicknames, etc. whether scrolling or stationary), specific color(s), sequences of colors (e.g., blinking or strobing colors), directional scrolling of colors (e.g., left-to-right, up-and-down), and the like.

Additionally or alternatively, the in-cabin media capture device 600 can cause the display face 602 to present one or more graphical elements synchronized with haptic interactions at a provider device or a requestor device for improved visibility. For instance, to help at pickup, a tap or swipe at a requestor application on a requestor device can cause the display face 602 to correspondingly pulse, flash, or scroll some color or alphanumeric text. For the in-cabin media capture device 600 to perform these or other functions, the selective media transmission system 106 can receive an indication, for example, of the haptic interactions at a provider device or a requestor device. In response to the received indication of the haptic interaction, the selective media transmission system 106 can then provide computer-executable instructions to the in-cabin media capture device 600 to correspondingly cause the display face 602 (and/or light halo 606) to present a pulse, flash, scrolling, color, alphanumeric text, etc. to coincide with the haptic interaction. Moreover, in transmitting indications of personalized beaconing from a requestor device to the in-cabin media capture device 600, the selective media transmission system 106 can improve efficiency and accuracy in aligning the requestor device and provider device at a pickup location.

Additionally or alternatively, in some embodiments, the selective media transmission system 106 can implement one or more dead-fronting protocols at the in-cabin media capture device 600. For example, in one or more embodiments, certain features of the in-cabin media capture device 600 will only activate based on authentication (e.g., logging in or proximity) of a provider and/or provider device. To illustrate, in one or more embodiments, the display face 602 lights up (or does not light up according to dead-fronting protocols) in response to authentication of the provider device at a provider application. For example, in some implementations, the in-cabin media capture device 600 can cause the display face 602 to dead-front (i.e., remain unlit) until the dynamic transportation matching system 104 authenticates the provider device. In this manner, the display face 602 can mitigate a risk of imposter vehicles, imposter provider devices, or imposter in-cabin media capture devices not associated with a transportation service coordinated by the dynamic transportation matching system 104. In these or other embodiments, one or more portions of the display face 602 are configured to light up upon authentication, and one or more other portions of the display face 602 are not configured to light up after authentication. For instance, in some embodiments, the display face 602 can present one or more graphical elements like "lyft" using dead space or negative space (i.e., by lighting a portion of the display face 602 around the one or more graphical elements).

For the in-cabin media capture device 600 to perform these or other security protocols, the selective media transmission system 106 can verify identity information from a provider device. For example, the selective media transmission system 106 may detect that a provider device is not logged into a provider device application. In turn, the selective media transmission system 106 may require the provider device to log into their provider device application before the in-cabin media capture device 600 will operate (e.g., power on, light up, provide personalized beaconing, activate media recording, etc.). In response to the selective media transmission system 106 receiving the proper login credentials from the provider device, the selective media transmission system 106 may provide computer-executable instructions to the in-cabin media capture device 600 to initiate operations as disclosed herein.

Similarly, to activate some security protocols, the selective media transmission system 106 can identify certain security protocol triggers. For example, in response to failed authentication attempts (e.g., a threshold number of failed login attempts into the provider device application), the selective media transmission system 106 may cause the in-cabin media capture device 600 to change to a locked-out mode for some period of time. Likewise, the selective media transmission system 106 can shut down the in-cabin media capture device 600 (including one or more graphical presentations or lighting at the display face 602 or the light halo 606) in the detected absence of a provider device. For example, when a provider device is not connected, logged in, or connected to the in-cabin media capture device 600, the selective media transmission system 106 may cause the in-cabin media capture device 600 to power off. In another example, if the in-cabin media capture device 600 does not recognize a provider (e.g., according to a facial recognition algorithm), the selective media transmission system 106 may cause the in-cabin media capture device 600 to power off. In this manner, the selective media transmission system 106 can reduce security concerns associated with unauthorized users (impersonators) accessing or utilizing the in-cabin media capture device 600 (e.g., to initiate unauthorized transportation services).

Further, the selective media transmission system 106 may implement one or more other security protocols at the in-cabin media capture device 600 in response to identifying certain security protocol triggers. For example, in response to identifying a security protocol trigger of unplugging the in-cabin media capture device 600, the selective media transmission system 106 can cause the in-cabin media capture device 600 to initiate battery usage for continued power supply, transmit a distress signal to a remote server, upload media recording metadata to the remote server, etc.

As further shown, the in-cabin media capture device 600 comprises the external-facing camera 604, for example, to record visual data in generating media recordings as described in relation to the foregoing figures. Additionally or alternatively, in some embodiments, the dynamic transportation matching system 104 utilizes the visual data recorded by the external-facing camera 604, for example, to perform various mapping functionalities. For instance, the external-facing camera 604 may record visual data comprising geographic features encountered during a transportation service such as potholes, bike lanes, dangerous pickup/drop-off zones, and the like which the dynamic transportation matching system 104 can utilize to improve transportation services and/or dynamically update mapping data for a geographic area.

The in-cabin media capture device 600 also comprises the light halo 606, which in some embodiments, circumnavigates the in-cabin media capture device 600 for improved visibility and recognition. In these or other embodiments, the light halo 606 comprises one or more colors, adjustable lumen output, etc. as configurable according to at least one of the selective media transmission system 106, a provider device, or a requestor device. Additionally or alternatively, in some embodiments, the light halo 606 changes colors or presents a specific color to indicate, for example: various states of a transportation service (e.g., pickup, in transport, drop-off), that the external-facing camera 604 or internal-facing camera 610 is recording, that a provider device is offline, etc. In these or other embodiments, the light halo 606 can sync with a luminescent ring around the external-facing camera 604 and/or the internal-facing camera 610 (e.g., around a lens of the external-facing camera 604 or of the internal-facing camera 610) that lights up to indicate recording is in progress or some other mode or state for the in-cabin media capture device 600.

As further shown in FIG. 6A, the in-cabin media capture device comprises the mounting base 608. The mounting base 608 can be any suitable shape or size and can be configured to mount to a variety of different surfaces. For example, the mounting base 608 can mount to a dash area of a transportation vehicle, a windshield of a transportation vehicle, a rear-view mirror of a transportation vehicle, etc. In some implementations, the mounting base 608 comprises a spring-loaded element to impart compression forces against two surfaces (e.g., a dashboard surface and a windshield surface) of a transportation vehicle. Additionally or alternatively, the mounting base 608 may comprise one or more suction elements, adhesive materials, etc. to removably attach the mounting base 608 inside a transportation vehicle. Additionally or alternatively, a body portion of the in-cabin media capture device 600 may be detachable from the mounting base 608 and/or interchangeable with various models of the in-cabin media capture device 600 (e.g., via a mechanical or electro-mechanical quick-release/quick-connect mounting system). Further, in some embodiments, the mounting base 608 attaches to an exterior portion of a transportation vehicle. For example, in the case where the transportation vehicle is an autonomous vehicle, the mounting base 608 can attach (or integrate) one or more sensors or devices associated with the in-cabin media capture device 600 to an exterior portion of a transportation vehicle (e.g., to a side-mirror, hood, top surface, front/rear bumpers, etc.).

As mentioned FIG. 6B illustrates a rear-perspective view of the in-cabin media capture device 600. As illustrated, the in-cabin media capture device 600 includes an internal-facing camera 610 for generating a media recording relating to intra-vehicle activity. Based on such a media recording, the selective media transmission system 106 can identify a trigger event and cause the in-cabin media capture device 600 to store and/or upload a media recording portion as described in relation to the foregoing figures.

Figure 7:
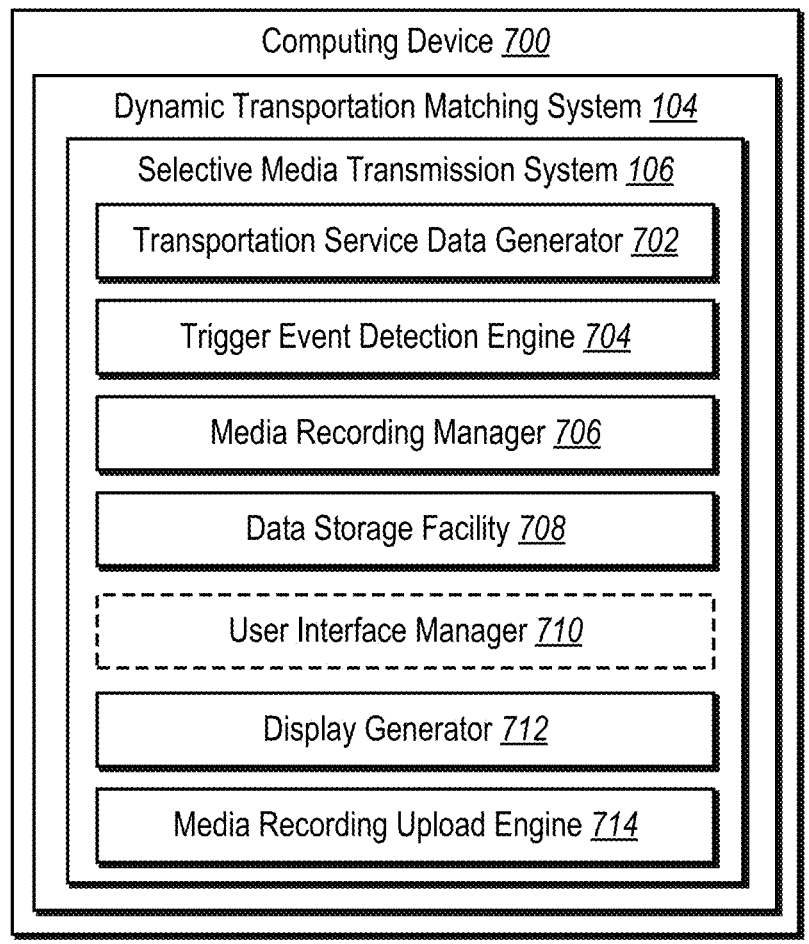
FIG. 7 illustrates an example schematic diagram of a selective media transmission system in accordance with one or more embodiments.

Turning to FIG. 7, additional detail will now be provided regarding various components and capabilities of the selective media transmission system 106. In particular, FIG. 7 illustrates an example schematic diagram of the selective media transmission system 106 implemented by a computing device 700 (e.g., the server(s) 102, the provider device 110, the requestor device 114, the third-party server 120, and/or the remote server 210, 308, 502) in accordance with one or more embodiments of the present disclosure. As shown, the computing device 700 can implement the selective media transmission system 106 and/or the dynamic transportation matching system 104. Also illustrated, the selective media transmission system 106 can include a transportation service data generator 702, a trigger event detection engine 704, a media recording manager 706, a data storage facility 708, a user interface manager 710, a display generator 712, and a media recording upload engine 714.

The transportation service data generator 702 can obtain, send, receive, measure, sense, and/or store transportation service data. As described in relation to the foregoing figures, the transportation service data may include, for example, motion data, GPS data, audio data, digital incident reports from provider/requestor devices, etc. In some embodiments, the transportation service data generator 702 may communicate with one or more sensors of a computing device in generating transportation service data. Additionally or alternatively, the transportation service data generator 702 can provide the transportation service data to one or more components of the computing device 700, for example, the trigger event detection engine 704.

The trigger event detection engine 704 can obtain, send, receive, process, and/or analyze data, such as transportation service data or media recordings, to identify trigger events (e.g., an upload trigger event and/or a storage trigger event) as described in relation to the foregoing figures. In some embodiments, the trigger event detection engine 704 may include a trigger analysis model and can analyze the transportation service data from the transportation service data generator 702 to identify a trigger event. In addition, the trigger event detection engine 704 can provide information relating an identified trigger event to the media recording manager 706.

The media recording manager 706 can determine a media recording portion based on an identified trigger event as described in relation to the foregoing figures. To do so, in some embodiments, the media recording manager 706 can determine a timestamp in a media recording corresponding to the identified trigger event at the trigger event detection engine 704, and in turn, apply a media duration to the timestamp. In addition, the media recording manager 706 can instruct the data storage facility 708 to store the media recording portion in a reserved memory partition (e.g., that is not set to overwrite after a predetermined overwrite looping duration).

The data storage facility 708 maintains data for the selective media transmission system 106. The data storage facility 708 (e.g., via one or more memory devices) can maintain data of any type, size, or kind, as necessary to perform the functions of the selective media transmission system 106, including storage of media recordings and/or media recording portions (e.g., in specific memory partitions as described in relation to the foregoing figures).

As also shown in FIG. 7, the selective media transmission system 106 in some embodiments can include the user interface manager 710. The user interface manager 710 can provide, manage, and/or control a graphical user interface (or simply "user interface"). In particular, the user interface manager 710 may generate and display a user interface by way of a display screen composed of a set of graphical components, objects, and/or elements that allow a user to perform a function. For example, the user interface manager 710 can receive user inputs from a user, such as a click/tap to submit a digital incident report as described in relation to the foregoing figures. Additionally, the user interface manager 710 can present a variety of types of information, including text, digital media items, navigation directions, transportation matching digital content, information relating to a media recording, etc.

The display generator 712 of the selective media transmission system 106 can dynamically generate, transmit, and/or receive computer-executable instructions for displaying graphical presentations, enacting security protocols, etc. as described in relation to the foregoing figures. For example, the display generator 712 can send or receive indications of user interactions to provide personalized beaconing. Additionally or alternatively, the display generator 712 can generate graphical presentations, instruct certain lighting/color patterns, etc. to coincide with the indications of the user interactions for personalized beaconing. Further, in some implementations, the display generator 712 can verify authentication of a provider device. Additionally or alternatively, the display generator 712 can execute, or cause execution of, computer-executable instructions to power on an in-cabin media capture device, dead-front, etc. as described above in relation to the foregoing figures.

The media recording upload engine 714 of the selective media transmission system 106 can intelligently determine what portions (if any) of a media recording to upload to a remote server and when to do so as described above in relation to the foregoing figures. For example, in response to identifying an upload trigger event according to the trigger event detection engine 704, the media recording upload engine 714 can identify a media recording portion to upload to a remote server. For instance, in a same or similar manner as for the media recording manager 706, the media recording upload engine 714 can identify a specific media recording portion from a media recording to upload to a remote server. In turn, the media recording upload engine 714 can transmit the media recording portion to a remote server for subsequent review and processing as described above.

Each of the components of the computing device 700 can include software, hardware, or both. For example, the components of the computing device 700 can include one or more instructions stored on a computer-readable storage medium and executable by processors of one or more computing devices, such as a client device or server device. When executed by the one or more processors, the computer-executable instructions of the selective media transmission system 106 can cause the computing device(s) (e.g., the computing device 700) to perform the methods described herein. Alternatively, the components of the computing device 700 can include hardware, such as a special-purpose processing device to perform a certain function or group of functions. Alternatively, the components of the computing device 700 can include a combination of computer-executable instructions and hardware.

Furthermore, the components of the computing device 700 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 700 may be implemented as a stand-alone application, such as a desktop or mobile application. Furthermore, the components of the computing device 700 may be implemented as one or more web-based applications hosted on a remote server.

Figure 8:
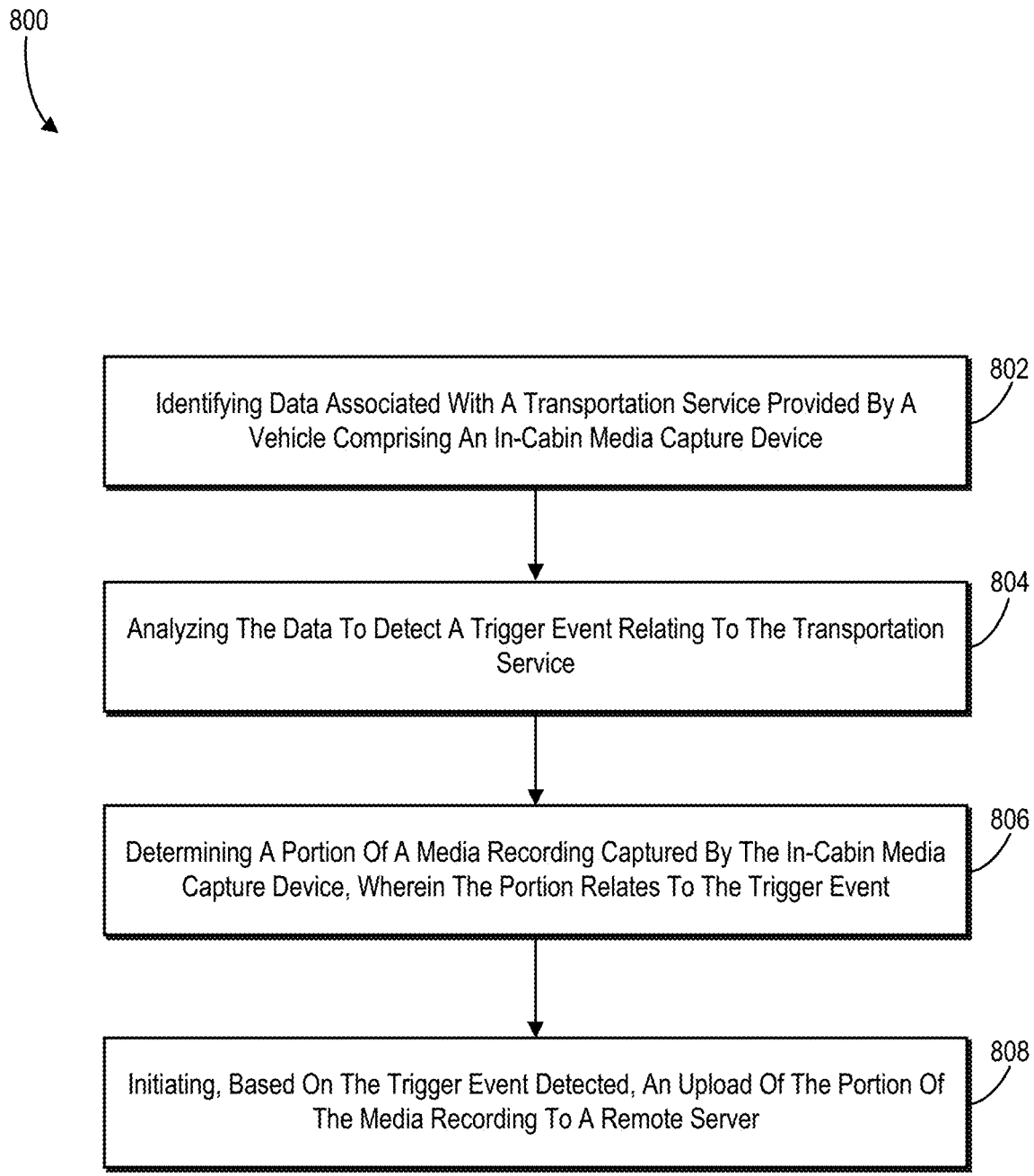
FIG. 8 illustrates a flowchart of a series of acts for initiating an upload of a portion of a media recording in accordance with one or more embodiments.

FIGS. 1-7, the corresponding text, and the examples provide several different systems, methods, techniques, components, and/or devices of the selective media transmission system 106 in accordance with one or more embodiments. In addition to the above description, one or more embodiments can also be described in terms of flowcharts including acts for accomplishing a particular result. For example, FIG. 8 illustrates a flowchart of a series of acts 800 for initiating an upload of a portion of a media recording in accordance with one or more embodiments. The selective media transmission system 106 may perform one or more acts of the series of acts 800 in addition to or alternatively to one or more acts described in conjunction with other figures. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As shown, the series of acts 800 includes an act 802 of identifying data associated with a transportation service provided by a vehicle comprising an in-cabin media capture device. In some embodiments, identifying the data associated with the transportation service comprises identifying motion signals from at least one of the in-cabin media capture device, the provider device, or the requestor device corresponding to the transportation service. Additionally or alternatively, in some embodiments, identifying the data associated with the transportation service comprises identifying global position system data or transportation time data corresponding to the transportation service. Further, in some embodiments, identifying the data associated with the transportation service comprises identifying the media recording.

The series of acts 800 further includes an act 804 of analyzing the data to detect a trigger event relating to the transportation service. In some embodiments, analyzing the data to detect the trigger event comprises analyzing the motion signals to identify at least one of: a collision event or a reckless driving event. Additionally or alternatively, in some embodiments, analyzing the data to detect the trigger event comprises comparing the global position system data or the transportation time data to an anticipated transportation pattern to determine a transportation irregularity. Further, in some embodiments, analyzing the data to detect the trigger event comprises applying a machine-learning model to the media recording to identify the trigger event.

In addition, the series of acts 800 includes an act 806 of determining a portion of a media recording captured by the in-cabin media capture device, wherein the portion relates to the trigger event. In some embodiments, determining the portion of the media recording that relates to the trigger event comprises: determining a timestamp in the media recording corresponding to the trigger event; identifying a media duration based on the trigger event; and determining the portion of the media recording by applying the media duration to the timestamp.

The series of acts 800 further includes an act 808 of initiating, based on the trigger event detected, an upload of the portion of the media recording to a remote server. In some embodiments, initiating the upload of the portion of the media recording to the remote server comprises initiating an upload of a subset of the media recording stored in a second memory partition of the in-cabin media capture device.

It is understood that the outlined acts in the series of acts 800 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of one or more additional or alternative acts not shown in FIG. 8, act(s) in the series of acts 800 may include: storing, at the in-cabin media capture device, the media recording in a first memory partition of the in-cabin media capture device set to overwrite after a predetermined overwrite looping duration; identifying a storage trigger event based on the data associated with the transportation service; and in response to identifying the storage trigger event, storing a subset of the media recording corresponding to the storage trigger event in a second memory partition of the in-cabin media capture device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 9:
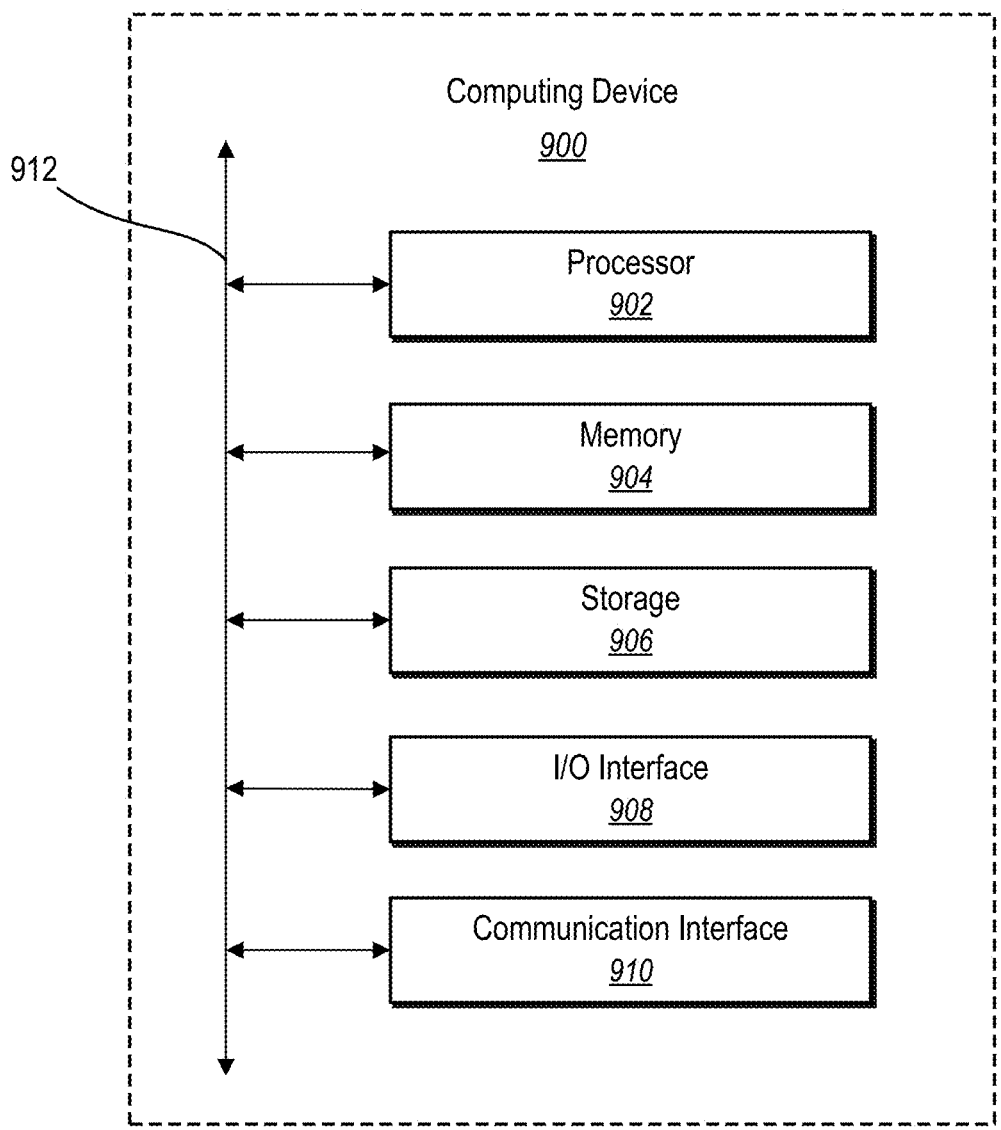
FIG. 9 illustrates a block diagram of an example computing device for implementing in accordance with one or more embodiments.

FIG. 9 illustrates a block diagram of an example computing device 900 that may be configured to perform one or more of the processes described above in accordance with one or more embodiments. One will appreciate that one or more computing devices, such as the computing device 900 may represent the computing devices described above (e.g., the computing device 700, the server(s) 102, the provider device 110, requestor device 114, the third-party server 120, and/or the remote servers 210, 308, 502). In one or more embodiments, the computing device 900 may be a mobile device (e.g., a mobile telephone, a smartphone, a PDA, a tablet, a laptop, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9.

Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of the computing device 900 to each other.

Figure 10:
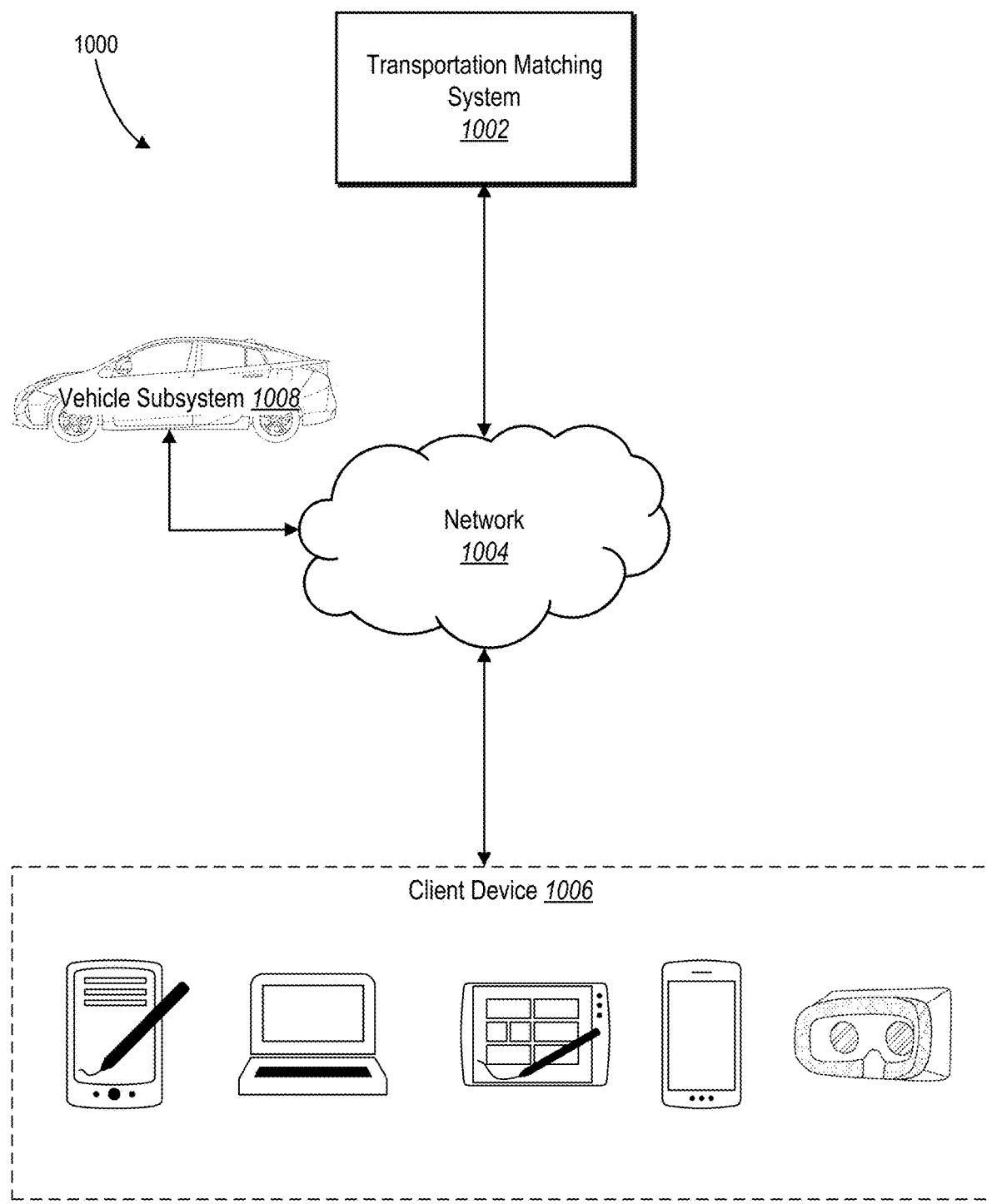
FIG. 10 illustrates an example network environment of a transportation matching system in accordance with one or more embodiments.

FIG. 10 illustrates an example network environment 1000 of a transportation matching system (e.g., the dynamic transportation matching system 104). The network environment 1000 includes a client device 1006, a transportation matching system 1002, and a vehicle subsystem 1008 connected to each other by a network 1004. Although FIG. 10 illustrates a particular arrangement of the client device 1006, the transportation matching system 1002, the vehicle subsystem 1008, and the network 1004, this disclosure contemplates any suitable arrangement of the client device 1006, the transportation matching system 1002, the vehicle subsystem 1008, and the network 1004. As an example, and not by way of limitation, two or more of the client devices 1006, the transportation matching system 1002, and the vehicle subsystem 1008 communicate directly, bypassing the network 1004. As another example, two or more of the client devices 1006, the transportation matching system 1002, and the vehicle subsystem 1008 may be physically or logically co-located with each other in whole or in part. Moreover, although FIG. 10 illustrates a particular number of the client devices 1006, the transportation matching systems 1002, the vehicle subsystems 1008, and the networks 1004, this disclosure contemplates any suitable number of the client devices 1006, the transportation matching systems 1002, the vehicle subsystems 1008, and the networks 1004. As an example, and not by way of limitation, the network environment 1000 may include multiple client devices 1006, the transportation matching systems 1002, the vehicle subsystems 1008, and the networks 1004.

This disclosure contemplates any suitable network 1004. As an example, and not by way of limitation, one or more portions of the network 1004 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 1004 may include one or more networks 1004.

Links may connect the client device 1006, the transportation matching system 1002, and the vehicle subsystem 1008 to the communication network 1004 or to each other. This disclosure contemplates any suitable links. In particular embodiments, one or more links include one or more wireline (such as for example Digital Subscriber Line (DSL) or Data Over Cable Service Interface Specification (DOCSIS), wireless (such as for example Wi-Fi or Worldwide Interoperability for Microwave Access (WiMAX), or optical (such as for example Synchronous Optical Network (SONET) or Synchronous Digital Hierarchy (SDH) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 1000. One or more first links may differ in one or more respects from one or more second links.

In particular embodiments, the client device 1006 may be an electronic device including hardware, software, or embedded logic components or a combination of two or more such components and capable of carrying out the appropriate functionalities implemented or supported by the client device 1006. As an example, and not by way of limitation, a client device 1006 may include any of the computing devices discussed above in relation to FIG. 10. A client device 1006 may enable a network user at the client device 1006 to access a network. A client device 1006 may enable its user to communicate with other users at other client devices 1006.

In particular embodiments, the client device 1006 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1006 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client device 1006 one or more Hyper Text Markup Language (HTML) files responsive to the HTTP request. The client device 1006 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the transportation matching system 1002 may be a network-addressable computing system that can host a ride share transportation network. The transportation matching system 1002 may generate, store, receive, and send data, such as, for example, user-profile data, concept-profile data, text data, ride request data, GPS location data, provider data, requestor data, vehicle data, or other suitable data related to the ride share transportation network. This may include authenticating the identity of providers and/or vehicles who are authorized to provide ride services through the transportation matching system 1002. In addition, the transportation service system may manage identities of service requestors such as users/requestors. In particular, the transportation service system may maintain requestor data such as driving/riding histories, personal data, or other user data in addition to navigation and/or traffic management services or other location services (e.g., GPS services).

In particular embodiments, the transportation matching system 1002 may manage ride matching services to connect a user/requestor with a vehicle and/or provider. By managing the ride matching services, the transportation matching system 1002 can manage the distribution and allocation of vehicle subsystem resources and user resources such as GPS location and availability indicators, as described herein.

The transportation matching system 1002 may be accessed by the other components of the network environment 1000 either directly or via network 1004. In particular embodiments, the transportation matching system 1002 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 1002 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1006, or a transportation matching system 1002 to manage, retrieve, modify, add, or delete, the information stored in data store.

In particular embodiments, the transportation matching system 1002 may provide users with the ability to take actions on various types of items or objects, supported by the transportation matching system 1002. As an example, and not by way of limitation, the items and objects may include ride share networks to which users of the transportation matching system 1002 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 1002 or by an external system of a third-party system, which is separate from the transportation matching system 1002 and coupled to the transportation matching system 1002 via a network 1004.

In particular embodiments, the transportation matching system 1002 may be capable of linking a variety of entities. As an example, and not by way of limitation, the transportation matching system 1002 may enable users to interact with each other or other entities, or to allow users to interact with these entities through an application programming interfaces (API) or other communication channels.

In particular embodiments, the transportation matching system 1002 may include a variety of servers, sub-systems, programs, modules, logs, and data stores. In particular embodiments, the transportation matching system 1002 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The transportation matching system 1002 may also include suitable components such as network interfaces, security mechanisms, load balancers, failover servers, management-and-network-operations consoles, other suitable components, or any suitable combination thereof. In particular embodiments, the transportation matching system 1002 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between the transportation matching system 1002 and one or more client devices 1006. An action logger may be used to receive communications from a web server about a user's actions on or off the transportation matching system 1002. In conjunction with the action log, a third-party-content-object log may be maintained of user exposures to third-party-content objects. A notification controller may provide information regarding content objects to a client device 1006. Information may be pushed to a client device 1006 as notifications, or information may be pulled from the client device 1006 responsive to a request received from the client device 1006. Authorization servers may be used to enforce one or more privacy settings of the users of the transportation matching system 1002. A privacy setting of a user determines how particular information associated with a user can be shared. The authorization server may allow users to opt in to or opt out of having their actions logged by the transportation matching system 1002 or shared with other systems, such as, for example, by setting appropriate privacy settings. Third-party-content-object stores may be used to store content objects received from third parties. Location stores may be used for storing location information received from the client devices 1006 associated with users.

In addition, the vehicle subsystem 1008 can include a human-operated vehicle or an autonomous vehicle. A provider of a human-operated vehicle can perform maneuvers to pick up, transport, and drop off one or more requestors according to the embodiments described herein. In certain embodiments, the vehicle subsystem 1008 can include an autonomous vehicle—i.e., a vehicle that does not require a human operator. In these embodiments, the vehicle subsystem 1008 can perform maneuvers, communicate, and otherwise function without the aid of a human provider, in accordance with available technology.

In particular embodiments, the vehicle subsystem 1008 may include one or more sensors incorporated therein or associated thereto. For example, sensor(s) can be mounted on the top of the vehicle subsystem 1008 or else can be located within the interior of the vehicle subsystem 1008. In certain embodiments, the sensor(s) can be located in multiple areas at once i.e., split up throughout the vehicle subsystem 1008 so that different components of the sensor(s) can be placed in different locations in accordance with optimal operation of the sensor(s). In these embodiments, the sensor(s) can include a LIDAR sensor and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop off a requestor.

In particular embodiments, the vehicle subsystem 1008 may include a communication device capable of communicating with the client device 1006 and/or the transportation matching system 1002. For example, the vehicle subsystem 1008 can include an on-board computing device communicatively linked to the network 1004 to transmit and receive data such as GPS location information, sensor-related information, requestor location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   capturing, using a rear-facing digital camera of an in-cabin media capture device, a first digital video associated with a transportation service provided by a vehicle;
   capturing, using a forward-facing digital camera of the in-cabin media capture device, a second digital video associated with the transportation service provided by the vehicle;
   analyzing both the first digital video and the second digital video to detect a trigger event relating to the transportation service;
   determining a portion of the first digital video and the second digital video captured by the in-cabin media capture device, to be moved from a memory partition with a predetermined overwrite looping duration to another memory partition without an overwrite looping duration, wherein the portion relates to the trigger event;
   generating, from the first digital video and the second digital video, a media classification for the first digital video and the second digital video;
   determining a priority of the first digital video and the second digital video based on the media classification generated from the first digital video and the second digital video; and
   initiating, based on the trigger event detected and based on the priority, an upload of the portion of the first digital video and the second digital video to a remote server.

2. The computer-implemented method of claim 1, wherein:
   the trigger event comprises at least one of a confrontation trigger event or a reckless driving event; and
   analyzing both the first digital video and the second digital video to detect the trigger event comprises detecting the confrontation trigger event or the reckless driving event by analyzing the first digital video to detect a confrontation between individuals within the vehicle corresponding to the transportation service or analyzing the second digital video to detect indications of reckless driving associated with the vehicle corresponding to the transportation service.

3. The computer-implemented method of claim 1, further comprising:
   identifying motion data associated with the transportation service; and
   analyzing the motion data to detect the trigger event.

4. The computer-implemented method of claim 1, wherein:
   analyzing both the first digital video and the second digital video to detect the trigger event comprises applying a machine-learning model to both the first digital video and the second digital video to identify the trigger event.

5. The computer-implemented method of claim 1, wherein determining the portion of the first digital video and the second digital video that relates to the trigger event comprises:
   determining a timestamp in the first digital video and the second digital video corresponding to the trigger event;
   identifying a media duration based on the trigger event; and
   determining the portion of the first digital video and the second digital video by applying the media duration to the timestamp.

6. The computer-implemented method of claim 1, further comprising:
   storing, at the in-cabin media capture device, the first digital video and the second digital video in a first memory partition of the in-cabin media capture device set to overwrite after a predetermined overwrite looping duration;
   identifying a storage trigger event based on the first digital video and the second digital video; and
   in response to identifying the storage trigger event, storing a subset of the first digital video and the second digital video corresponding to the storage trigger event in a second memory partition of the in-cabin media capture device.

7. The computer-implemented method of claim 6, wherein initiating the upload of the portion of the first digital video and the second digital video to the remote server comprises initiating the upload of the subset of the first digital video and the second digital video stored in the second memory partition of the in-cabin media capture device.

8. A non-transitory computer-readable medium comprising instructions that, when executed by at least one processor, cause a computer system to:
   capture, using a rear-facing digital camera of an in-cabin media capture device, a first digital video associated with a transportation service provided by a vehicle;

capture, using a forward-facing digital camera of the in-cabin media capture device, a second digital video associated with the transportation service provided by the vehicle;

analyze both the first digital video and the second digital video to detect a trigger event relating to the transportation service;

determine a portion of the first digital video and the second digital video captured by the in-cabin media capture device, to be moved from a memory partition with a predetermined overwrite looping duration to another memory partition without an overwrite looping duration, wherein the portion relates to the trigger event;

generate, from the first digital video and the second digital video, a media classification for the first digital video and the second digital video;

determine a priority of the first digital video and the second digital video based on the media classification generated from the first digital video and the second digital video; and initiate, based on the trigger event detected and based on the priority, an upload of the portion of the first digital video and the second digital video to a remote server.

9. The non-transitory computer-readable medium of claim 8, further comprising instructions that, when executed by the at least one processor, cause the computer system to:

identify motion signals from at least one of the in-cabin media capture device, a provider device, or a requestor device corresponding to the transportation service; and analyze the motion signals to identify at least one of: a collision event or a reckless driving event.

10. The non-transitory computer-readable medium of claim 8, further comprising instructions that, when executed by the at least one processor, cause the computer system to:

identify motion data associated with the transportation service; and analyze the motion data to detect the trigger event.

11. The non-transitory computer-readable medium of claim 8, further comprising instructions that, when executed by the at least one processor, cause the computer system to analyze both the first digital video and the second digital video to detect the trigger event by applying a machine-learning model to the first digital video and the second digital video to identify the trigger event.

12. The non-transitory computer-readable medium of claim 8, wherein generating the media classification for the first digital video and the second digital video comprises determining a type of trigger event from a plurality of trigger event types, a severity class for the trigger event, or a notification class for the trigger event.

13. The non-transitory computer-readable medium of claim 8, further comprising instructions that, when executed by the at least one processor, cause the computer system to:

store, at the in-cabin media capture device, the first digital video and the second digital video in a first memory partition of the in-cabin media capture device set to overwrite after a predetermined overwrite looping duration;

identify a storage trigger event based on the first digital video and the second digital video; and in response to identifying the storage trigger event, store a subset of the first digital video and the second digital video corresponding to the storage trigger event in a second memory partition of the in-cabin media capture device.

14. The non-transitory computer-readable medium of claim 13, further comprising instructions that, when executed by the at least one processor, cause the computer system to initiate the upload of the portion of the first digital video and the second digital video to the remote server by initiating the upload of the subset of the first digital video and the second digital video stored in the second memory partition of the in-cabin media capture device.

15. A system comprising:

one or more memory devices; and one or more computing devices configured to cause the system to:

capture, using a rear-facing digital camera of an in-cabin media capture device, a first digital video associated with a transportation service provided by a vehicle;

capture, using a forward-facing digital camera of the in-cabin media capture device, a second digital video associated with the transportation service provided by the vehicle;

analyze both the first digital video and the second digital video to detect a trigger event relating to the transportation service;

determine a portion of the first digital video and the second digital video captured by the in-cabin media capture device, to be moved from a memory partition with a predetermined overwrite looping duration to another memory partition without an overwrite looping duration, wherein the portion relates to the trigger event;

generate, from the first digital video and the second digital video, a media classification for the first digital video and the second digital video;

determine a priority of the first digital video and the second digital video based on the media classification generated from the first digital video and the second digital video; and initiate, based on the trigger event detected and based on the priority, an upload of the portion of the first digital video and the second digital video to a remote server.

16. The system of claim 15, wherein the one or more computing devices are further configured to cause the system to:

identify motion signals from at least one of the in-cabin media capture device, a provider device, or a requestor device corresponding to the transportation service; and analyze the motion signals to identify at least one of: a collision event or a reckless driving event.

17. The system of claim 15, wherein the one or more computing devices are further configured to cause the system to:

identify motion data associated with the transportation service; and analyze the motion data to detect the trigger event.

18. The system of claim 15, wherein the one or more computing devices are further configured to cause the system to analyze the first digital video and the second digital video to detect the trigger event by applying a machine-learning model to the first digital video and the second digital video to identify the trigger event.

19. The system of claim 15, wherein the one or more computing devices are further configured to cause the system to determine the portion of the first digital video and the second digital video that relates to the trigger event by:

determining a timestamp in the first digital video and the second digital video corresponding to the trigger event;

identifying a video duration based on the trigger event; and determining the portion of the first digital video and the second digital video by applying the video duration to the timestamp.

20. The system of claim 15, wherein the one or more computing devices are further configured to cause the system to:
store, at the in-cabin media capture device, the digital video recording the first digital video and the second digital video in a first memory partition of the in-cabin media capture device set to overwrite after a predetermined overwrite looping duration;
identify a storage trigger event based on the first digital video and the second digital video; and
in response to identifying the storage trigger event, store a subset of the first digital video and the second digital video corresponding to the storage trigger event in a second memory partition of the in-cabin media capture device.

* * * * *